(12) United States Patent
Yabe

(10) Patent No.: US 12,037,206 B2
(45) Date of Patent: Jul. 16, 2024

(54) CARGO-HANDLING APPARATUS AND PROGRAM

(71) Applicants: KABUSHIKI KAISHA TOSHIBA, Tokyo (JP); Toshiba Infrastructure Systems & Solutions Corporation, Kawasaki (JP)

(72) Inventor: Yosuke Yabe, Kawasaki (JP)

(73) Assignees: KABUSHIKI KAISHA TOSHIBA, Tokyo (JP); TOSHIBA INFRASTRUCTURE SYSTEMS & SOLUTIONS CORPORATION, Kawasaki (JP)

(*) Notice: Subject to any disclaimer, the term of this patent is extended or adjusted under 35 U.S.C. 154(b) by 802 days.

(21) Appl. No.: 17/123,606

(22) Filed: Dec. 16, 2020

(65) Prior Publication Data

US 2021/0101760 A1 Apr. 8, 2021

Related U.S. Application Data

(63) Continuation of application No. PCT/JP2019/023940, filed on Jun. 17, 2019.

(30) Foreign Application Priority Data

Jun. 18, 2018 (JP) .................................. 2018-115564

(51) Int. Cl.
*B65G 47/91* (2006.01)
*B25J 15/06* (2006.01)
*B65G 59/04* (2006.01)

(52) U.S. Cl.
CPC .............. *B65G 47/91* (2013.01); *B25J 15/06* (2013.01); *B65G 59/04* (2013.01)

(58) Field of Classification Search
CPC ........... B25J 15/06; B65G 47/91; B65G 59/04
See application file for complete search history.

(56) References Cited

U.S. PATENT DOCUMENTS 8,162,362 B2 * 4/2012 Braunschweiger .... B65G 61/00
414/797
8,473,094 B2 * 6/2013 Becker ................ B65G 47/918
414/796

(Continued)

FOREIGN PATENT DOCUMENTS

JP 02-305716 A 12/1990
JP 07-215479 A 8/1995

(Continued)

OTHER PUBLICATIONS

International Search Report dated Aug. 13, 2019 in PCT/JP2019/023940 filed on Jun. 17, 2019, 2 pages.

(Continued)

*Primary Examiner* — Saul Rodriguez
*Assistant Examiner* — Brendan P Tighe
(74) *Attorney, Agent, or Firm* — Maier & Maier, PLLC

(57) ABSTRACT

According to the present embodiment, a cargo-handling apparatus includes a plurality of upper surface sucking portions, at least one side surface sucking portion, a detector, a first moving device, a control unit, and a conveyor. The control unit is configured to select an upper surface sucking portion to be used from the upper surface sucking portions based on the information on the upper surface detected by the detector and control the first moving device to suck the upper surface by the selected upper surface sucking portion and suck the side surface by the side surface sucking portion.

9 Claims, 12 Drawing Sheets

(56) References Cited

U.S. PATENT DOCUMENTS

| | | | |
|---|---|---|---|
| 9,498,887 B1 | 11/2016 | Zevenbergen et al. | |
| 10,053,305 B2* | 8/2018 | Eto | B65G 61/00 |
| 10,226,865 B2* | 3/2019 | Nakayama | B25J 9/1669 |
| 10,351,362 B2 | 7/2019 | Tanaka et al. | |
| 10,457,490 B2* | 10/2019 | Nakamoto | B65G 41/003 |
| 10,576,630 B1* | 3/2020 | Diankov | B25J 9/1633 |
| 10,902,377 B2* | 1/2021 | Murphy | G05B 19/124 |
| 10,906,186 B2* | 2/2021 | Takahashi | B25J 15/0616 |
| 2014/0179501 A1* | 6/2014 | Akama | B31B 50/262 |
| | | | 493/162 |
| 2014/0277721 A1 | 9/2014 | Tomo et al. | |
| 2016/0137435 A1* | 5/2016 | Tanaka | B65G 65/00 |
| | | | 414/800 |
| 2017/0107058 A1 | 4/2017 | Nakamoto et al. | |

FOREIGN PATENT DOCUMENTS

| | | |
|---|---|---|
| JP | 11-333774 A | 12/1999 |
| JP | 2000-084882 A | 3/2000 |
| JP | 2014-176926 A | 9/2014 |
| JP | 2015-040130 A | 3/2015 |
| JP | 2016-055995 A | 4/2016 |
| JP | 2016-094280 A | 5/2016 |
| WO | WO 2017/082385 A1 | 5/2017 |

OTHER PUBLICATIONS

Extended European Search Report dated Feb. 3, 2022 in European Patent Application No. 19822848.8, 7 pages.

* cited by examiner

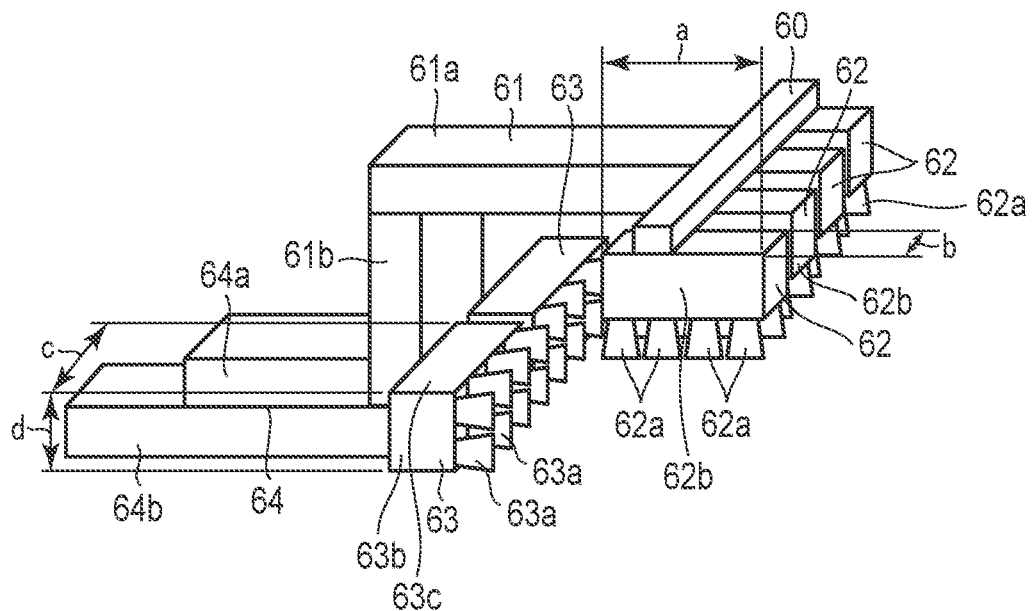
F I G. 2
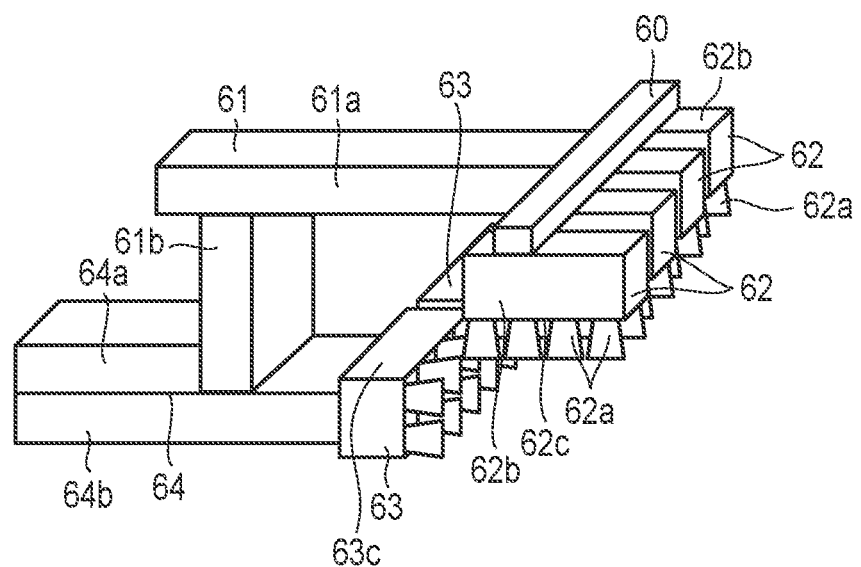
F I G. 3

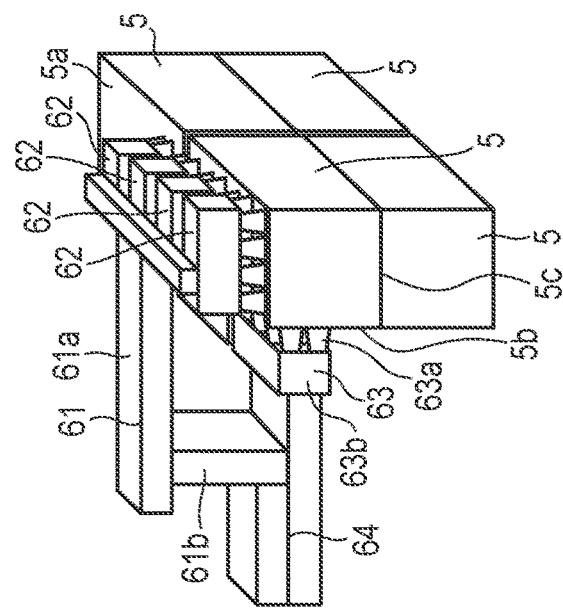
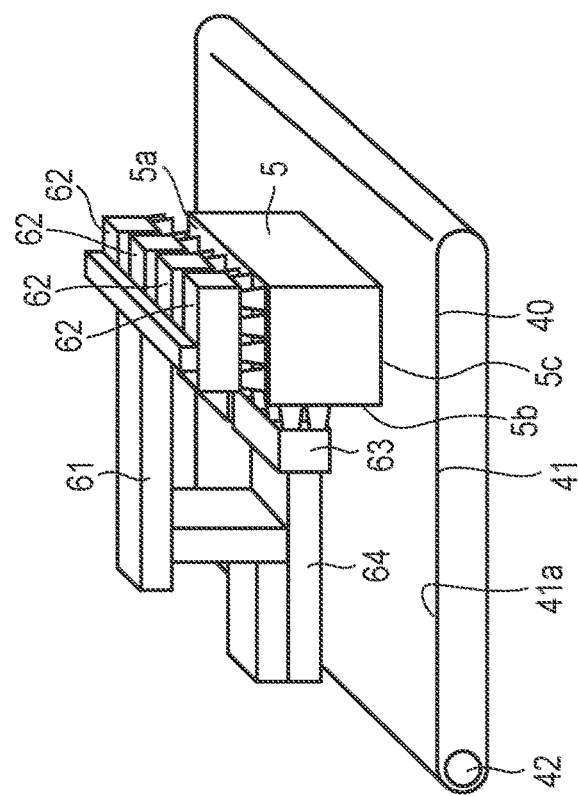
F I G. 11 ured to detect information on the upper surface of the package, a first moving device configured to move the upper surface sucking portions and the side surface sucking portion, a control unit, and a conveyor.

CARGO-HANDLING APPARATUS AND PROGRAM

CROSS-REFERENCE TO RELATED APPLICATIONS

This application is a Continuation Application of PCT Application No. PCT/JP2019/023940, filed Jun. 17, 2019 and based upon and claiming the benefit of priority from prior Japanese Patent Application No. 2018-115564, filed Jun. 18, 2018, the entire contents of all of which are incorporated herein by reference.

FIELD

Embodiments described herein relate generally to a cargo-handling apparatus and program.

BACKGROUND

As a cargo-handling apparatus for taking out a package from a mount portion such as a base on which a plurality of packages are placed, a configuration in which the package is sucked up by sucking on an upper surface of the package is known.

BRIEF DESCRIPTION OF THE DRAWING(S)

FIG. 2 is a perspective view schematically showing a configuration of a sucking device used in the cargo-handling apparatus.

FIG. 3 is a perspective view schematically showing the configuration of the sucking device.

FIG. 11 is an explanatory view schematically showing an example of the operation of the cargo-handling apparatus.

DETAILED DESCRIPTION

According to the present embodiment, a cargo-handling apparatus includes a plurality of upper surface sucking portions configured to suck an upper surface of a package, at least one side surface sucking portion configured to suck a side surface of the package, a detector configured to detect information on the upper surface of the package, a first moving device configured to move the upper surface sucking portions and the side surface sucking portion, a control unit, and a conveyor.

The control unit is configured to select an upper surface sucking portion to be used from the upper surface sucking portions based on the information on the upper surface detected by the detector and control the first moving device to suck the upper surface by the selected upper surface sucking portion and suck the side surface by the side surface sucking portion. The conveyor is on which the package sucked by the selected upper surface sucking portion and the side surface sucking portion and moved by the first moving device is placed, and which moves the placed package.

Figure 1:
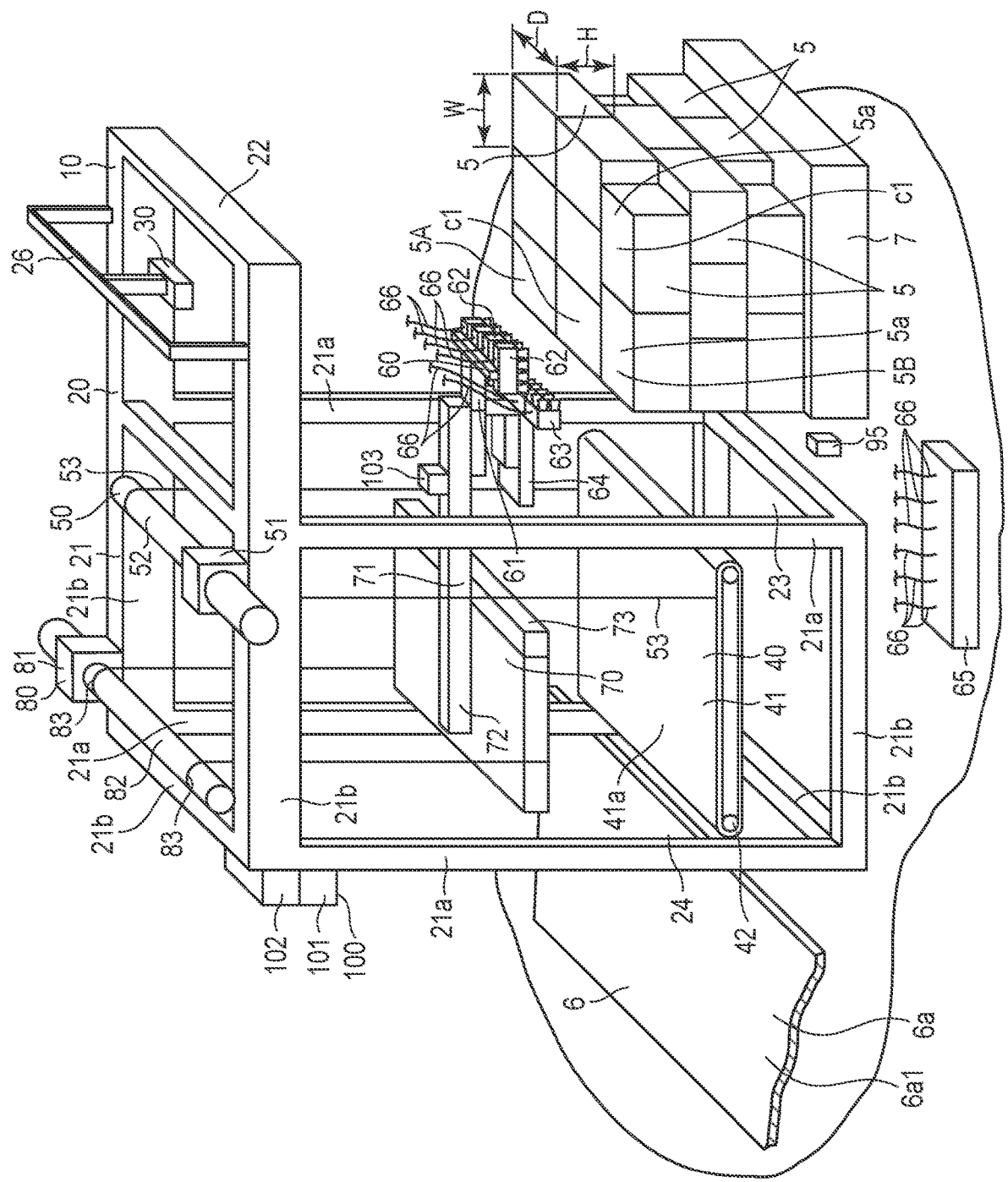
FIG. 1 is a perspective view schematically showing a cargo-handling apparatus according to an embodiment.

A cargo-handling apparatus 10 according to an embodiment will be described with reference to FIG. 1 to FIG. 12. FIG. 1 is a perspective view schematically showing a configuration of the cargo-handling apparatus 10. FIG. 2 is a perspective view schematically showing a configuration of a sucking device 60 of the cargo-handling apparatus 10, and illustrates a state in which a side surface sucking portion 63 used for the sucking device 60 is at an initial position. FIG. 3 is a perspective view schematically showing a configuration of the sucking device 60, and illustrates a state in which a plurality of side surface sucking portions 63 are moved to a side of a plurality of upper surface sucking portions 62.

Figure 4:
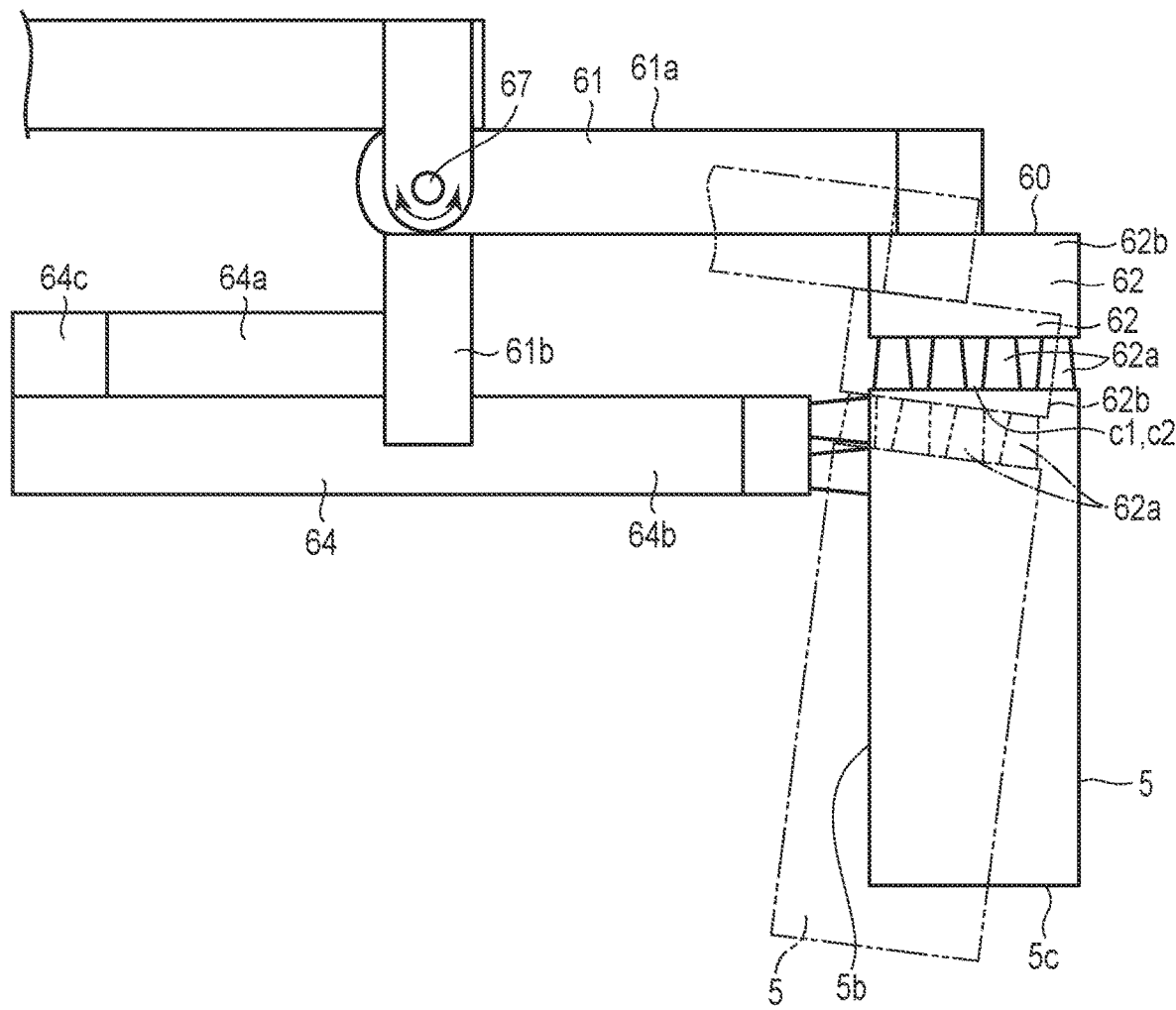
FIG. 4 is a side view schematically showing the configuration of the sucking device.
Figure 5:
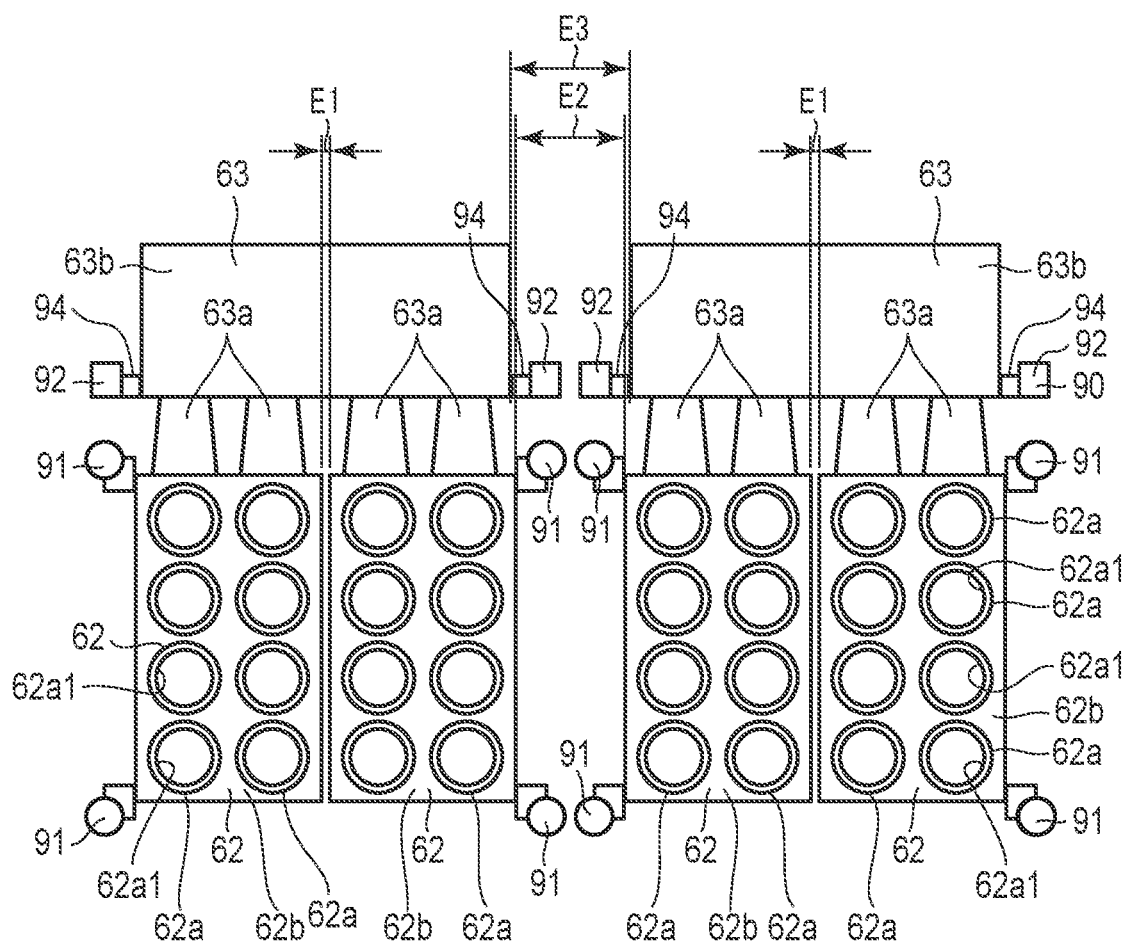
FIG. 5 is a bottom view schematically showing the configuration of the sucking device.
Figure 6:
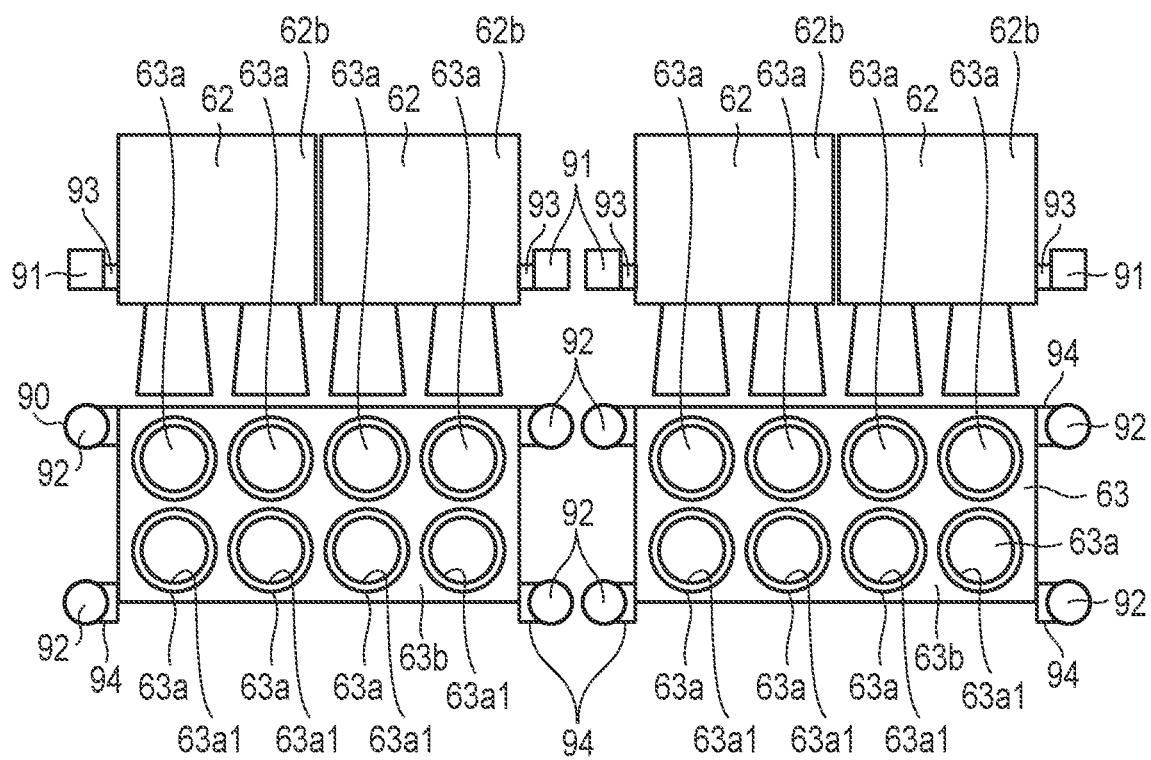
FIG. 6 is a front view schematically showing the configuration of the sucking device.
Figure 7:
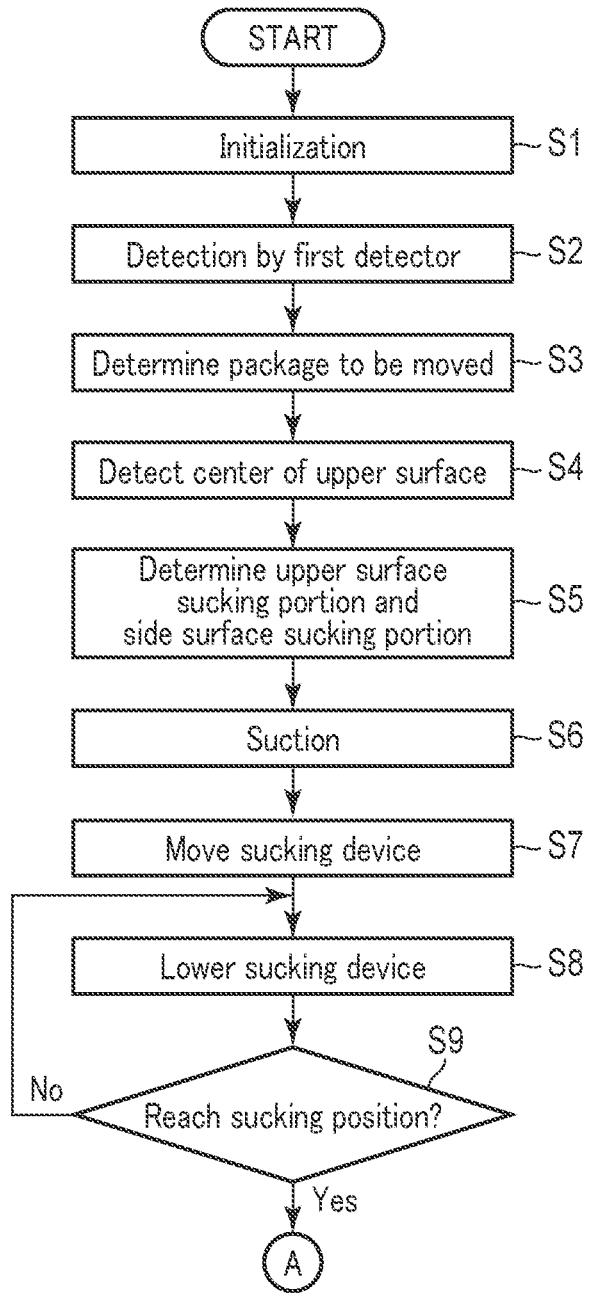
FIG. 7 is a flowchart showing an example of an operation of the cargo-handling apparatus.
Figure 8:
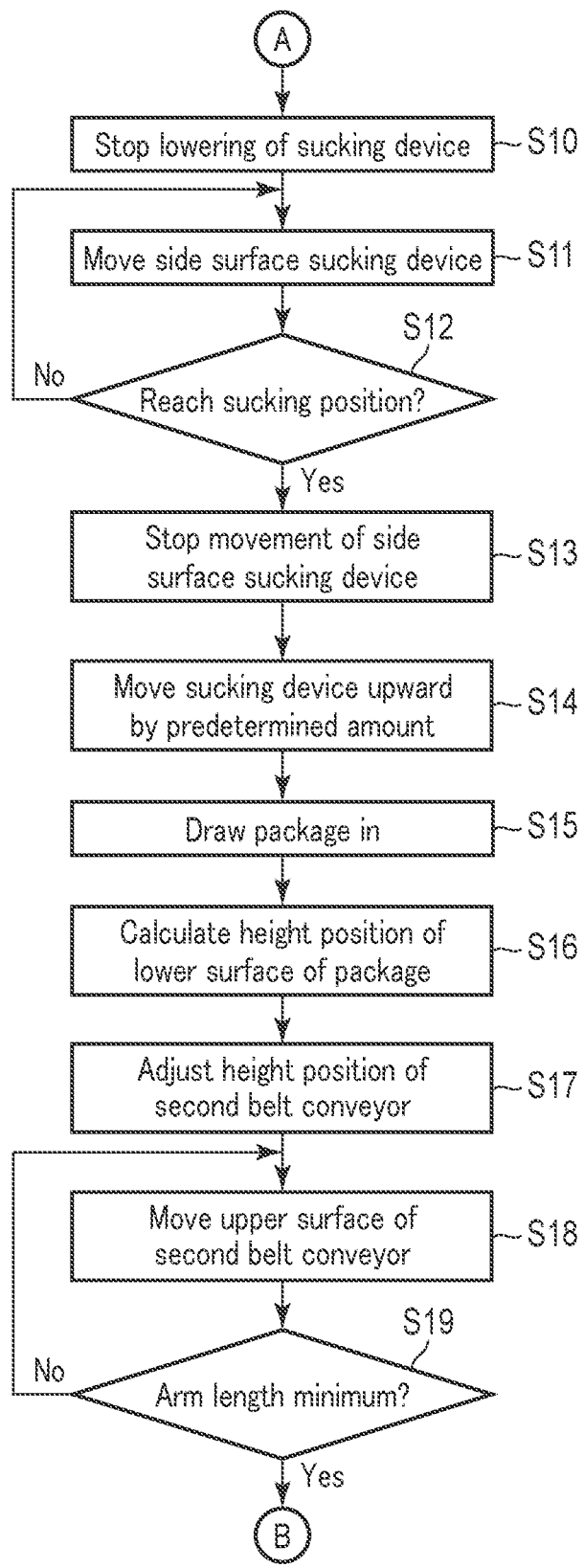
FIG. 8 is a flowchart showing an example of the operation of the cargo-handling apparatus.
Figure 9:
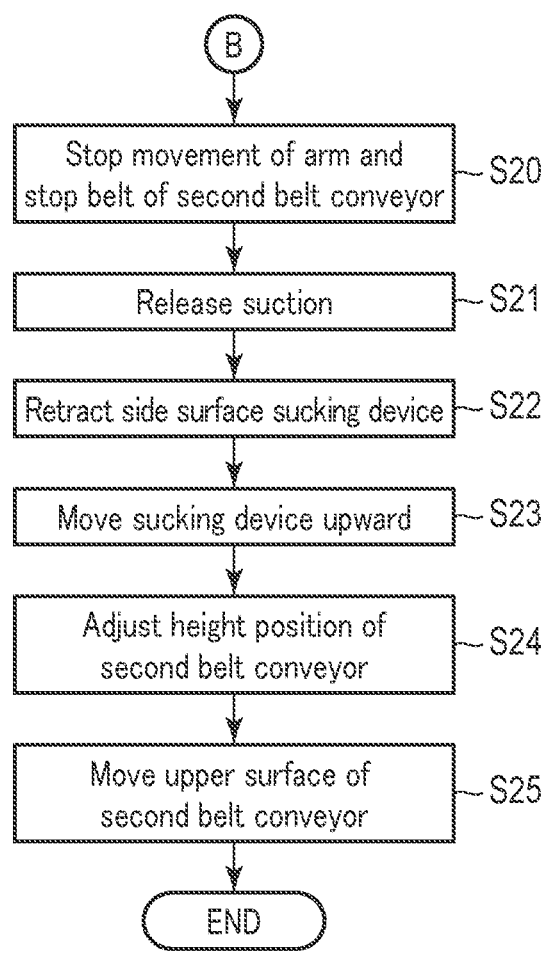
FIG. 9 is a flowchart showing an example of the operation of the cargo-handling apparatus.
Figure 10:
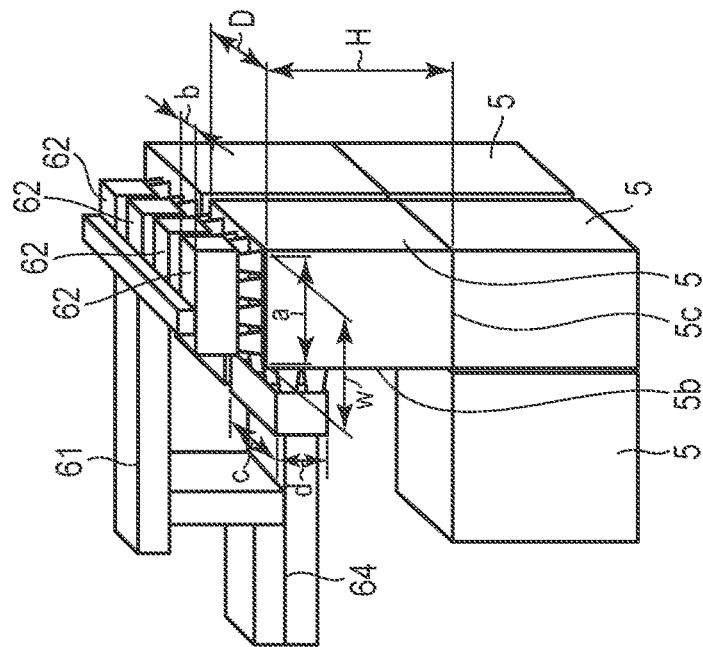
FIG. 10 is an explanatory view schematically showing an example of the operation of the cargo-handling apparatus.
Figure 10:
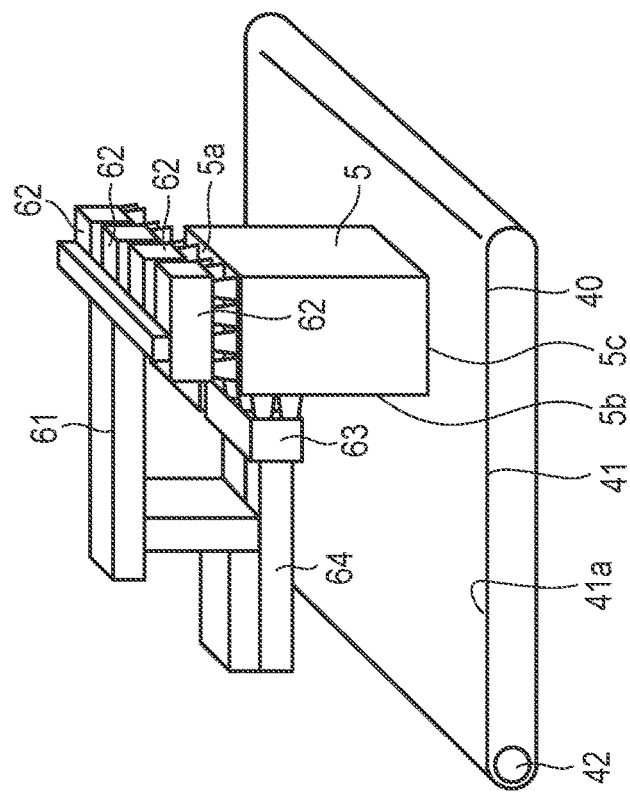
Figure 12:
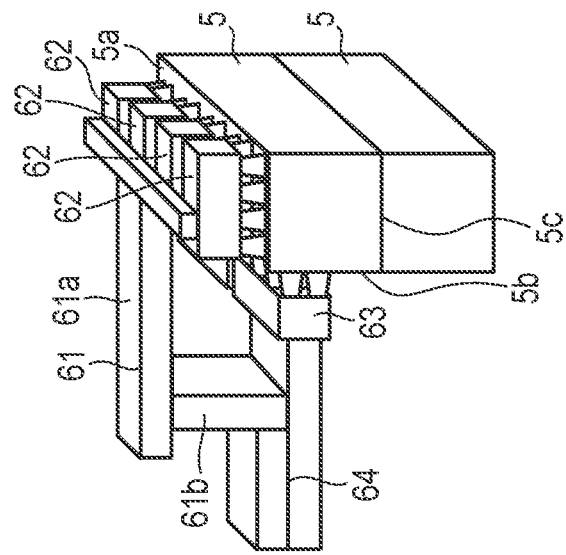
FIG. 12 is an explanatory view schematically showing an example of the operation of the cargo-handling apparatus.
Figure 12:
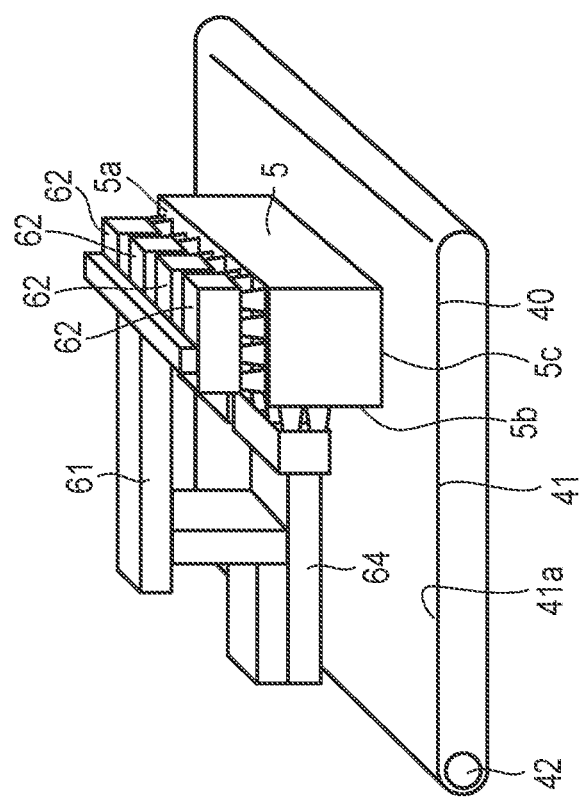

FIG. 4 is a side view schematically showing the sucking device 60. FIG. 5 is a bottom view schematically showing the sucking device 60. FIG. 6 is a front view schematically showing the sucking device 60. FIG. 7 to FIG. 9 are flowcharts showing an example of the operation of the cargo-handling apparatus 10. FIG. 10 to FIG. 12 are explanatory views schematically showing an example of the operation of the cargo-handling apparatus 10. In FIG. 1 to FIG. 12, the shape of each component is simplified or the size is enlarged or reduced for convenience of explanation.

As shown in FIG. 1, the cargo-handling apparatus 10 is used at a site 1 such as a warehouse where cargo handling work is performed. In the present embodiment, a first belt conveyor 6 that conveys packages 5 to another destination is installed at the site 1. The cargo-handling apparatus 10 takes out the packages 5 one by one from a mount portion 7 such as a base on which a plurality of packages 5 are placed, and moves them to the first belt conveyor 6. The cargo-handling apparatus 10 is arranged in the vicinity of one edge along the conveying direction of the first belt conveyor 6. The mount portion 7 is disposed at a position facing the first belt conveyor 6 with the cargo-handling apparatus 10 interposed therebetween.

In this description, a direction parallel to a direction from the mount portion 7 toward the first belt conveyor 6 is defined as a front-rear direction. A direction orthogonal to an up-down direction and orthogonal to the front-rear direction is defined as a width direction.

The package 5 has a rectangular parallelepiped shape. The upper surface 5a of the package 5 has a rectangular shape. The dimension of the upper surface 5a in a longitudinal direction is defined as D, and the dimension thereof in a lateral direction is defined as W. A height of the package 5 is defined as H. The dimensions D, W, and H are stored in a storage 101 of a controller 100, which will be described later.

Even in the packages 5 having the same dimensions D, W, and H, the dimension in the front-rear direction and the dimension in the width direction may be different depending on the orientation. An example of this point will be described with reference to a package 5A and a package 5B shown in FIG. 1. The package 5A and the package 5B have the same dimensions. The package 5A has a dimension D in the front-rear direction and a dimension W in the width direction. The package 5B is disposed in an orientation rotated by 90 degrees in the up-down direction with respect to the package 5A, and has a dimension W in the front-rear direction and a dimension D in the width direction.

As shown in FIG. 1 to FIG. 6, the cargo-handling apparatus 10 includes a housing 20, a first detector 30 configured to detect information on the upper surface of the package 5 mounted on the mount portion 7, a second belt conveyor 40 provided in the housing 20 and configured to move the package 5 to the first belt conveyor 6, and a first lifting and lowering device 50 provided in the housing 20 and configured to lift and lower the second belt conveyor 40 inside the housing 20.

The cargo-handling apparatus 10 includes the sucking device 60 including the plurality of upper surface sucking portions 62 capable of sucking an upper surface 5a of the package 5 and the plurality of side surface sucking portions 63 capable of sucking a side surface 5b of the package 5, a negative pressure generating device 65 configured to generate a negative pressure in the sucking device 60, a moving device (first moving device) 70 provided in the housing 20 and configured to move the sucking device 60 between the mount portion 7 and the second belt conveyor 40, a second detector 90 configured to detect that a distance between the sucking device 60 and the package 5 becomes a predetermined distance or less, a third detector 95 configured to detect a height of a lower surface 5c of the package 5 sucked by the sucking device 60, and a controller 100.

The cargo-handling apparatus 10 selects the upper surface sucking portion 62 to be used from the plurality of upper surface sucking portions 62 and selects the side surface sucking portion 63 to be used from the plurality of side surface sucking portions 63 according to the upper surface 5a of the package 5. Then, the sucking device 60 is moved to the mount portion 7 by the moving device 70, and the package 5 is sucked by the selected upper surface sucking portion 62 and the selected side surface sucking portion 63. The sucking device 60 is moved by the moving device 70 to the second belt conveyor 40 and the suction is released there, so that the package 5 is placed on the second belt conveyor 40 and moved to the first belt conveyor 6 by the second belt conveyor 40. The first belt conveyor 6 is an example of a destination to which the package 5 is moved by the cargo-handling apparatus 10. In other words, the first belt conveyor 6 is an example of a destination to which the package 5 is moved by the second belt conveyor 40.

The housing 20 is located between the first belt conveyor 6 and the mount portion 7, and for example, fixed to a floor surface of the site 1. The housing 20 includes, for example, a housing main body 21 and an eaves portion 22.

The housing main body 21 has an opening 23 communicating the inside with the outside in the front-rear direction in a region facing the mount portion 7. The opening 23 has such a size that the package 5, the sucking device 60, and a part of the moving device 70 can move from the mount portion 7 side into the housing main body 21. The width of the opening 23 is equal to or larger than the width of the mount portion 7. The ends in the width direction of the opening 23 are respectively opposed to the ends in the width direction of the mount portion 7 in the front-rear direction, or located outside thereof in the width direction. Further, the housing main body 21 has an opening 24 that communicates the inside and the outside in the front-rear direction in a region facing the first belt conveyor 6. The opening 24 has a size that allows the package 5 to move therethrough.

The inside of the housing main body 21 is constituted so that the sucking device 60 and the package 5 sucked by the sucking device 60 can be moved by the moving device 70 to the second belt conveyor 40 through the opening 23, and can be moved to the opening 24 by the second belt conveyor 40.

The housing main body 21 as described above is configured in a shape having, for example, four pillar portions 21a and a plurality of beam portions 21b provided at upper ends and lower ends of the four pillar portions 21a. The opening 23 is defined by the two pillar portions 21a and the two beam portions 21b on the mount portion 7 side. The opening 24 is defined by the two pillar portions 21a and the two beam portions 21b on the first belt conveyor 6 side.

The eaves portion 22 is formed in, for example, a frame shape protruding forward from the upper ends of the two pillar portions 21a on the mount portion 7 side. The eaves portion 22 is located above the mount portion 7. The eaves portion 22 has a fixing portion 26 to which the first detector 30 is fixed.

The first detector 30 is fixed to the fixing portion 26. The first detector 30 is configured to detect at least information necessary for detecting the dimension in the width direction of the upper surface Sa of the package 5 and the position of a center C1 of the upper surface 5a. The first detector 30 is, for example, a camera. The first detector 30 captures an image of the upper surface 5a of each of the plurality of packages 5 placed on the mount portion 7. The first detector 30 transmits the captured image to the controller 100.

The second belt conveyor 40 includes a belt 41 on which the package 5 can be placed and a motor 42 configured to drive the belt 41. The belt 41 is an endless belt. The motor 42 is disposed at one end of the belt 41 configured as a flat annular belt. The motor 42 drives the belt 41 by pulling an upper surface 41a of the belt 41 toward the motor 42. The second belt conveyor 40 configured as described above is installed in the housing main body 21 in an orientation in which the motor 42 is located on the first belt conveyor 6 side and the movement direction of the upper surface 41a of the belt 41 is parallel to the front-rear direction.

One end of the belt 41 on the side of the opening 23 is located in the vicinity of the opening 23. One end of the belt 41 on the side of the opening 24 is located in the vicinity of the opening 24. The distance from one end of the belt 41 on the first belt conveyor 6 side to a belt 6a of the first belt conveyor 6 is smaller than the dimension of the package 5 in the front-rear direction, and is set to a distance at which the package 5 can move from the belt 41 to the belt 6a. In other words, the clearance between the belt 41 and the belt 6a is set such that the package 5 does not fall through the clearance.

The first lifting and lowering device 50 includes a first drive unit 51, for example, provided on the beam portion 21b at the upper end of the housing main body 21, a first shaft 52 provided in the first drive unit 51, and a first wire 53 wound around the first shaft 52. When the first drive unit 51 is driven, the first shaft 52 is rotated. When the first shaft 52 is rotated, the first belt conveyor 40 is lifted and lowered via the second wire 53. The first lifting and lowering device 50 may be configured to lift and lower the second belt conveyor 40. The above-described configuration of the first lifting and lowering device 50 is an example and is not limited thereto.

The sucking device 60 includes a base portion 61 supported by the moving device 70, the upper surface sucking portions 62 fixed to the base portion 61 and configured to suck the upper surface 5a of the package 5, the side surface sucking portions 63 configured to suck the side surface 5b of the package 5 on the housing main body 21 side, and a front-rear moving device (second moving device) 64 provided on the base portion 61 and configured to move the side surface sucking portions 63 in the front-rear direction. The sucking device 60 holds the package 5 by sucking the upper surface 5a with the upper surface sucking portions 62 and sucking the side surface 5b with the side surface sucking portions 63.

The base portion 61 includes a base portion main body 61a configured in a rod shape extending in one direction, and an extension portion 61b extending from one end of the base portion main body 61a in the longitudinal direction in a direction orthogonal to the longitudinal direction of the base portion main body 61a.

As shown in FIG. 4, the base portion 61 configured as described above is rotatably connected to the moving device 70 by a rotation shaft 67 parallel to the width direction. The base portion main body 61a and the extension portion 61b have a positional relationship which allows the base portion main body 61a to be parallel to the front-rear direction and the extension portion 61b to extend downward. One end surface of the base portion main body 61a on the rotation shaft 67 side is configured to be, for example, a curved surface that allows the base portion main body 61a to rotate.

Further, the base portion 61 is configured to rotate by a predetermined angle from an initial position at which the upper surface sucking portions 62 and the side surface sucking portions 63 do not suck the package 5. The predetermined angle is an angle at which the sucking device 60 does not come into contact with the moving device 70 when the base portion 61 rotates around the rotation shaft 67 due to the weight of the package 5. In the present embodiment, the predetermined angle is, for example, 10 degrees to 15 degrees.

Thus, the base portion 61 configured as described above is maintained at the initial position at which the base portion 61 is parallel to the front-rear direction in a state in which the upper surface sucking portions 62 and the side surface sucking portions 63 do not suck the package 5 due to the weight of the upper surface sucking portions 62, the weight of the side surface sucking portions 63, and the weight of the front-rear moving device 64.

For example, four upper surface sucking portions 62 are used. As shown in FIGS. 2 and 3, the four upper surface sucking portions 62 are fixed to, for example, a front end portion of the base portion 61, and are arranged in the width direction of the base portion 61.

Each of the upper surface sucking portions 62 includes a plurality of first suction pads 62a and a first support portion 62b having a rectangular parallelepiped shape that supports the first suction pads 62a.

The first suction pads 62a are supported by the first support portion 62b. Each of the first suction pads 62a has an opening 62a1.

The first suction pads 62a are fixed to one of the outer surfaces of the first support portion 62b. As shown in FIG. 5, the first suction pads 62a are provided in such a number that the openings 62a1 do not exit from the four sides of the fixing surface when the fixing surface to which the first suction pads 62a are fixed is seen in a plan view. It should be noted that the state in which the openings 62a1 do not exit from the four sides means that the openings 62a1 do not exit from the four sides even when the first suction pads 62a are deformed by being compressed in the axial direction while the first suction pads 62a are sucking the upper surface 5a.

In the present embodiment, the first suction pads 62a of the maximum number that does not cause the openings 62a1 to exit from the four sides of the fixing surface are used; for example, eight first suction pads are used. The eight first suction pads 62a are disposed inside the four sides of the fixing surface of the first support portion 62b in the surface direction of the fixing surface and in the vicinity of the four sides of the fixing surface in the plan view. More specifically, since the fixing surface has a rectangular shape that is long in one direction, the first suction pads are arranged in two rows in the lateral direction and in four rows in the longitudinal direction.

The first suction pads 62a are formed in a cylindrical shape and communicate with the inside of the first support portion 62b. In each of the first suction pads 62a, when the opening 62a1 is closed by the upper surface 5a of the package 5 in a state where air is sucked by the negative pressure generating device 65, a negative pressure is generated inside and the upper surface 5a is sucked by the negative pressure. Each of the first suction pads 62a is connected to a tube 66 via the first support portion 62b.

The first support portion 62b has a space communicating with each of the openings 62a1 of the first suction pads 62a. The first support portion 62b is connected to the tube 66. The first support portion 62b has, for example, a rectangular parallelepiped appearance. Through the first support portion 62b, the tube 66 and the first suction pads 62a are fluidically connected.

As shown in FIG. 2, the dimension of the first support portion 62b in the front-rear direction when fixed to the base portion 61 is defined as a, and the dimension in the width direction is defined as b. The dimension a in the front-rear direction and the dimension b are smaller than the minimum value of the dimension D in the longitudinal direction and the dimension W in the lateral direction of the package 5.

In other words, the minimum value of the dimension D in the longitudinal direction and the minimum value of the dimension W in the lateral direction of the package 5 placed on the mount portion 7 are selected in accordance with the dimensions a and b of the upper surface sucking portion 62 and the dimensions of the side surface sucking portions 63 described later.

The four upper surface sucking portions 62 configured as described above are fixed to the base portion main body 61a in an orientation in which the respective openings 62a1 of the first suction pads 62a are positioned on a plane orthogonal to the up-down direction when the base portion 61 is at the initial position. The four upper surface sucking portions 62 are arranged side by side in the width direction in an orientation in which the longitudinal direction is along the front-rear direction. The interval in the width direction between the two upper surface sucking portions 62 adjacent in the width direction is set to an interval E1 or an interval E2.

In the present embodiment, in a case where a first approach sensor 91 to be described later is not disposed between the two upper surface sucking portions 62 arranged side by side in the width direction, the interval between the two upper surface sucking portions 62 is set to the interval E1. The interval E1 is a minute interval. In a case where the first approach sensor 91 is disposed between the two upper surface sucking portions 62 arranged side by side in the width direction, the interval between the two upper surface sucking portions 62 is set to the interval E2. The interval E2 is set to such an interval that the upper surface sucking portions 62 do not interfere with the first approach sensor 91. The interval E2 is longer than the interval E1.

In the upper surface sucking portions 62 configured as described above, in the present embodiment, the minimum number of the upper surface sucking portions 62 used to stably suck the upper surface 5a of the package 5 is two. The minimum number is equal to the maximum number of the upper surface sucking portions 62 in which the openings 62a1 of all the first suction pads 62a are closed by the upper surface 5a. The minimum number two is determined by the dimension D in the longitudinal direction and the dimension W in the lateral direction of the upper surface 5a of the package 5, the dimension b in the width direction of the first support portion 62b, and the intervals E1 and E2.

The side surface sucking portions 63 are fixed to the front-rear moving device 64 and are moved in the front-rear direction by the front-rear moving device 64. Each of the side surface sucking portions 63 includes a plurality of second suction pads 63a and a second support portion 63b having a rectangular parallelepiped shape that supports the second suction pads 63a.

The second suction pads 63a are supported by the second support portion 63b. Each of the second suction pads 63a has an opening 63a1.

The second suction pads 63a are fixed to one of the outer surfaces of the second support portion 63b. As shown in FIG. 6, the second suction pads 63a are provided in such a number that the openings 63a1 do not exit from the four sides of the fixing surface of the second support portion 63b when the fixing surface to which the second suction pads 63a are fixed is seen in a plan view. It should be noted that the state in which the openings 63a1 do not exit from the four sides means that the openings 63a1 do not exit from the four sides even when the second suction pads 63a are deformed by being compressed in the axial direction while the second suction pads 63a are sucking the upper surface 5a.

In the present embodiment, the second suction pads 63a of the maximum number that does not cause the openings 63a1 to exit from the four sides of the fixing surface are used; for example, eight second suction pads are used. The eight second suction pads 63a are disposed inside the four sides of the fixing surface of the second support portion 63b in the surface direction of the fixing surface and in the vicinity of the four sides of the fixing surface in the plan view. More specifically, since the fixing surface has a rectangular shape that is long in one direction, the second suction pads are arranged in two rows in a lateral direction and in four rows in a longitudinal direction.

In each of the second suction pads 63a, when the opening 63a1 is closed by the side surface 5b in a vacuumed state made by the negative pressure generating device 65, a negative pressure is generated inside and the side surface 5b is sucked by the negative pressure. Each of the eight second suction pads 63a is connected to the tube 66 connected to the negative pressure generating device 65 via the second support portion 63b.

The second support portion 63b has a space communicating with each of the openings 63a1 of the second suction pads 63a. The second support portion 63b is connected to the tube 66. The second support portion 63b has, for example, a rectangular parallelepiped appearance. Through the second support portion 63b, the tube 66 and the second suction pads 63a are fluidically connected.

The second support portion 63b is fixed to the front-rear moving device 64 in an orientation in which the fixing surface is on a plane orthogonal to the front-rear direction and the longitudinal direction of the fixing surface is parallel to the width direction. In a state in which the second support portion 63b is fixed to the front-rear moving device 64, the dimension of the fixing surface in the width direction is defined as c, and the dimension of the fixing surface in the height direction is defined as d. The dimension c is smaller than the minimum value of the dimension D in the longitudinal direction and the minimum value of the dimension W in the lateral direction of the package 5. The dimension d is smaller than the minimum value of a dimension H of the package 5 in the height direction.

The minimum number of the side surface sucking portions 63 configured as described above used to stably suck the side surface 5b of the package 5 is one. The minimum number is equal to the maximum number of the side surface sucking portions 63 in which the openings 63a1 of all the second suction pads 63a are closed by the side surfaces 5b. The minimum number one is determined by the dimension D in the longitudinal direction and the dimension W in the lateral direction of the upper surface 5a of the package 5, the dimension H in the height direction of the side surface 5b, and the dimension c in the width direction of the second support portion 63b.

The side surface sucking portion 63 may have the same configuration as the upper surface sucking portion 62. In the present embodiment, as an example, the side surface sucking portion 63 has the same configuration as the upper surface sucking portion 62.

Since the minimum number of the upper surface sucking portions 62 used to suck the upper surface 5a of the package 5 is two, the number of the upper surface sucking portions 62 is four, and the minimum number of the side surface sucking portions 63 used to suck the side surface 5b is one, the number of the side surface sucking portions 63 configured as described above used in this embodiment is two. The two side surface sucking portions 63 are arranged side by side in the width direction in an orientation in which the longitudinal direction is along the width direction.

One of the side surface sucking portions 63 is positioned on the inner side in the width direction with respect to an upper surface sucking portion 62 positioned at one end in the width direction of the four upper surface sucking portions 62 arranged in the width direction and an upper surface sucking portion 62 adjacent to this upper surface sucking portion 62 in plan view. The other side surface sucking portion 63 is positioned on the inner side in the width direction with respect to an upper surface sucking portion 62 positioned at the other end in the width direction of the four upper surface sucking portions 62 arranged in the width direction and an upper surface sucking portion 62 adjacent to this upper surface sucking portion 62 in plan view. The interval between the two side surface sucking portions 63 in the width direction is set to an interval E3.

Furthermore, the upper surfaces 63c of the second support portions 63b of the side surface sucking portions 63 are located on the same plane as the lower ends of the first suction pads 62a of the upper surface sucking portions 62 when suction is not performed.

The front-rear moving device 64 includes a base portion 64a fixed to, for example, the extension portion 61b of the base portion 61, a moving portion 64b connected to the base portion 64a so as to be linearly movable, and a driving portion 64c. For example, the two side surface sucking portions 63 are fixed to a head of the moving portion 64b in the moving direction. A position farthest from the upper surface sucking portions 62 in the front-rear direction in the moving range of the moving portion 64b is defined as an initial position of the moving portion 64b.

The driving portion 64*c* is configured to drive the moving portion 64*b* to move the side surface sucking portions 63. The driving portion 64*c* is, for example, a motor. The driving portion 64*c* is fixed to the base portion 64*a*, for example. The front-rear moving device 64 configured as described above is fixed to the base portion 61 in an orientation in which the moving direction of the moving portion 64*b* is parallel to the front-rear direction when the base portion 61 is at the initial position.

In addition, the front-rear moving device 64 is configured to move the two side surface sucking portions 63 with respect to the four upper surface sucking portions 62 between a position separated by the same distance or more as a half of the dimension in the front-rear direction of the package 5 having an assumed maximum dimension in the front-rear direction as shown in FIG. 2, and a position separated by the same distance as a half of the dimension in the front-rear direction of the package 5 having an assumed minimum dimension in the front-rear direction as shown in FIG. 3.

In other words, the front-rear moving device 64 is configured to arrange the side surface sucking portions 63 to be used at a position where the second suction pads 63*a* are in contact with the side surface 5*b* of the package 5, such that all the first suction pads 62*a* of the upper surface sucking portions 62 to be used from among the four upper surface sucking portions 62 are in contact with a predetermined position of the upper surface 5*a* of the package 5 having the largest dimension in the front-rear direction or a predetermined position of the upper surface 5*a* of the package 5 having the smallest dimension in the front-rear direction.

Here, the predetermined position is a position at which a center C2 of the upper surface sucking portion 62 to be used faces the center C1 of the upper surface 5*a* of the package 5 in the up-down direction or a position on the far side in the front-rear direction from the center C1 in the up-down direction. In other words, the predetermined position is a position at which the selected upper surface sucking portion 62 sucks the center C1 of the upper surface 5*a* of the package 5, or a position on a side opposite to the side surface sucking portion 63 across the side surface 5*b* from the center C1. That is, sucking the upper surface 5*a* at a position where the center C2 faces the center C1 in the up-down direction means sucking the center C1 of the upper surface 5*a*.

Here, the horizontal position of the center C2 of the upper surface sucking portion 62 to be used is the same as the center of the region in which a lower surface 62*c* of the first support portion 62*b* is located. The lower surface 62*c* is a fixing surface to which the first suction pad 62*a* is fixed.

If one upper surface sucking portion 62 is used, a region in which the lower surface 62*c* of the upper surface sucking portion 62 is located coincides with the lower surface 62*c* of the upper surface sucking portion 62. If a plurality of upper surface sucking portions 62 are used, the region includes the lower surface 62*c* of the upper surface sucking portion 62 positioned at one end in the width direction among the upper surface sucking portions 62, the lower surface 62*c* of the upper surface sucking portion 62 positioned at the other end in the width direction among the upper surface sucking portions 62, and a region between these two lower surfaces 62*c*.

The negative pressure generating device 65 is configured to individually perform a vacuuming operation on each of the upper surface sucking portions 62 and each of the side surface sucking portions 63. For example, the negative pressure generating device 65 may include a plurality of valves, and may be configured to switch between the air suction state and the air suction release state by opening and closing the valves. Alternatively, the negative pressure generating device 65 may have a configuration including vacuum pumps respectively for the upper surface sucking portions 62 and side surface sucking portions 63. The negative pressure generating device 65 is fluidically connected to each of the upper surface sucking portions 62 and each of the plurality of side surface sucking portion 63 via the tube 66. The negative pressure generating device 65 includes, for example, a pump.

The moving device 70 horizontally and vertically moves the upper surface sucking portions 62 and the side surface sucking portions 63. In the present embodiment, the moving device 70 moves the upper surface sucking portions 62 and the side surface sucking portions 63 by moving the base portion 61.

Since the cargo-handling apparatus 10 includes the front-rear moving device 64, the moving device 70 is configured to move the upper surface sucking portions 62 and the side surface sucking portions 63 at the same time, and is not limited to a configuration that integrally moves the upper surface sucking portions 62 and the side surface sucking portions 63.

That is, in a state in which the front-rear moving device 64 is stopped and the side surface sucking portions 63 are not moved with respect to the upper surface sucking portions 62, the moving device 70 integrally moves the upper surface sucking portions 62 and the side surface sucking portions 63. In other words, the moving device 70 performs a moving operation in a state in which the position of the side surface sucking portions 63 with respect to the upper surface sucking portion 62 is fixed. In a state in which the front-rear moving device 64 moves the side surface sucking portions 63, the moving device 70 moves the upper surface sucking portions 62 and the side surface sucking portions 63 at the same time. However, since the relative position of the upper surface sucking portions 62 and the side surface sucking portions 63 is not fixed, these portions do not move integrally.

The moving device 70 includes, for example, a horizontal moving device 71 that horizontally moves the base portion 61, and a second lifting and lowering device 80 that lifts and lowers the base portion 61 by lifting and lowering the horizontal moving device 71.

The horizontal moving device 71 includes an arm 72 to which the base portion 61 is connected by the rotation shaft 67, and a support portion 73 that movably supports the arm 72.

The arm 72 is configured to move the base portion 61 in one direction. As an example, the arm 72 is configured to be extensible and contractible. The arm 72 moves the base portion 61 in one direction by extending and contracting. The arm 72 is configured to be extensible and contractible by, for example, a telescopic structure.

The support portion 73 supports the arm 72 so as to be movable in a direction orthogonal to the extending and contracting direction of the arm 72. The extension and contraction of the arm 72 is performed by a driving portion such as a motor or an air cylinder. The arm 72 is moved with respect to the support portion 73 in the direction orthogonal to the extending and contracting direction by a driving portion such as a motor or an air cylinder.

In the horizontal moving device 71 configured as described above, the support portion 73 and a part of the arm 72 are housed in the housing main portion 21 in an orientation in which the extending and contracting direction of the arm 72 is parallel to the front-rear direction, and the moving direction of the arm 72 with respect to the support portion 73, which is orthogonal to the extending and contracting direction, is parallel to the width direction.

The minimum length of the arm 72 is such that the center C2 of the upper surface sucking portion 62 to be used can be located above the belt 41 of the second belt conveyor 40. In the present embodiment, since the upper surface sucking portions 62 are arranged in the width direction, the position of the center C2 in the front-rear direction is the same regardless of the number of upper surface sucking portions 62 used. The minimum length of the arm 72 is preferably a dimension which causes the center C2 of the first suction pads 62a to be located on the horizontal surface portion of the belt 41.

Further, the horizontal moving device 71 is configured to move the upper surface sucking portions 62 to be used to a position where the center C2 faces the center C1 of the upper surface 5a with respect to each of the packages 5 placed on the mount portion 7.

The second lifting and lowering device 80 includes, for example, a second drive unit 81 provided in the beam portion 21b at the upper end of the housing main body 21, a second shaft 82 provided in the second drive unit 81, and a second wire 83 wound around the second shaft 82. When the second drive unit 81 is driven, the second shaft 82 is rotated. When the second shaft 82 is rotated, the horizontal moving device 71 is lifted and lowered via the second wire 83.

The second lifting and lowering device 80 may be configured to lift and lower the horizontal moving device 71, and is not limited to the above-described configuration.

As shown in FIG. 5 and FIG. 6, the second detector 90 includes a first approach sensor 91 configured to detect that the upper surface sucking portion 62 is closer to the upper surface 5a than a first predetermined distance, and a second approach sensor 92 configured to detect that the side surface sucking portion 63 is closer to the side surface 5b than a second predetermined distance.

In the present embodiment, for example, a plurality of first approach sensors 91 are provided. The first approach sensor 91 detects that the upper surface sucking portion 62 has approached the upper surface 5a by the first predetermined distance by detecting a first detection target portion fixed to the first suction pads 62a in the upper surface sucking portion 62. In the present embodiment, the first detection target portion is, for example, the first support portion 62b. The first support portion 62b comprises, for example, metal which is detected by the first approach sensors 91. Alternatively, the first support portion 62b is formed of metal.

The first predetermined distance corresponds to a position at which the first suction pads 62a can suck the upper surface 5a. The position at which the first suction pads 62a can suck the upper surface 5a is a position at which the first suction pads 62a are in contact with the upper surface 5a and the openings 62a1 of the first suction pads 62a are closed by the upper surface 5a.

In the present embodiment, for example, a plurality of second approach sensors 92 are provided. In the present embodiment, for example, a plurality of second approach sensors 92 are provided. The second approach sensor 92 detects that the side surface sucking portion 63 has approached the side surface 5b by the second predetermined distance by detecting a second detection target portion fixed to the second suction pads 63a in the side surface sucking portion 63. In the present embodiment, the second detected portion is, for example, the second support portion 63b. The second support portion 63b comprises, for example, metal which is detected by the second approach sensors 92. Alternatively, the second support portion 63b is formed of metal.

The second predetermined distance corresponds to a position at which the second suction pads 63a can suck the side surface 5b. The position at which the second suction pads 63a can suck the side surface 5b is a position at which the second suction pads 63a are in contact with the side surface 5b and the openings 63a1 of the second suction pads 63a are closed by the side surface 5b.

The first approach sensors 91 are fixed to the first support portion 62b by, for example, a fixing member 93, and are disposed around the combination of the upper surface sucking portions 62 of the number that stably suck the package 5 having the smallest upper surface 5a.

The number of upper surface sucking portions 62 included in the combination referred to herein is equal to the maximum number of upper surface sucking portions 62 which allows all the second suction pads 63a to suck the upper surface 5a. For example, when all of the first suction pads 62a of two upper surface sucking portions 62 arranged in the width direction suck the upper surface 5a, while at least one first suction pad 62a of three upper surface sucking portions 62 arranged in the width direction does not suck the upper surface 5a, the number of upper surface sucking portions 62 that stably suck the upper surface 5a is two. In the present embodiment, the number of upper surface sucking portions 62 that stably suck the package 5 having the smallest upper surface 5a is two.

For this reason, in the present embodiment, four first approach sensors 91 are provided for a combination of one upper surface sucking portion 62 positioned on the outer side in the width direction, among the four upper surface sucking portions 62, and one upper surface sucking portion 62 positioned on the inner side in the width direction with respect to this upper surface sucking portion 62. To be specific, one first approach sensor 91 is arranged outside of each of the four corner portions facing each other of the two lower surfaces 62c of the sets of upper surface sucking portions 62.

The second approach sensors 92 are fixed to the second support portion 63b by, for example, a fixing member 94, and are arranged around the side surface sucking portions 63 of the number necessary to stably suck the package 5 having the smallest upper surface 5a. In the present embodiment, the number of the side surface sucking portions 63 necessary to stably suck the side surface 5b of the package 5 having the smallest upper surface 5a is one. In this embodiment, one second approach sensor 92 is arranged outside of each of the four corner portions of the front surface of one second support portion 63b.

The third detector 95 is, for example, a laser range finder disposed between the housing main body 21 and the mount portion 7, as shown in FIG. 1. The third detector 95 is configured to detect a height position of the lower surface 5c of the package 5 that passes above the third detector 95. The third detector 95 transmits the detection result to the controller 100.

As shown in FIG. 1, the controller 100 is electrically connected to the first detector 30, the second belt conveyor 40, the first lifting and lowering device 50, the front-rear moving device 64, the negative pressure generating device 65, the horizontal moving device 71, the second lifting and lowering device 80, the second detector 90, and the third detector 95.

The controller 100 controls the second belt conveyor 40, the first lifting and lowering device 50, the front-rear moving device 64, the negative pressure generating device 65, the horizontal moving detector 71, and the second lifting and lowering device 80 based on an image captured by the first detector 30, a detection result of the second detector 90, and a detection result of the third detector 95.

In the present embodiment, the controller 100 includes a storage 101, a main control unit 102, and a sub-control unit 103. The detection results of the first to third units 102, 90, and 95 are transmitted to the main control detector 30.

The storage 101 stores information on the dimension a in the front-rear direction of the first support portion 62b, the dimension b in the width direction of the first support portion 62b, the height d of the first support portion 62b of the upper surface sucking portion 62, the interval E1, and the interval E2. In addition, the storage 101 stores information on positions of the side surface sucking portion 63 with respect to the four upper surface sucking portions 62.

Furthermore, the storage 101 stores a minimum value of the dimension D in the longitudinal direction and a minimum value of the dimension W in the lateral direction of the upper surface 5a, and a minimum value of the height dimension H of each of the packages 5 placed on the mount portion 7. The information on the minimum value of the dimension D, the minimum value of the dimension W, and the minimum value of the dimension H is stored by, for example, an operator.

Moreover, the storage 101 stores a program for operating the cargo-handling apparatus 10. The program causes a computer including the storage 101, the main control unit 102, and the sub-control unit 103 to realize a plurality of functions including a function of selecting an upper surface sucking portion 62 to be used from the upper surface sucking portions 62 based on the information on the upper surface 5a of the package 5 detected by the first detector 30, a function of selecting a side surface sucking portion to be used from the side surface sucking portions 63 based on the information on the upper surface 5a of the package 5 detected by the first detector 30, a function of sucking the upper surface 5a by the selected upper surface sucking portion 62, and a function of sucking the side surface 5b by the selected side surface sucking portion 63. Hereinafter, a plurality of functions including these functions will be described.

The main control unit 102 has functions 1 to 10.

The function 1 is a function of selecting a package 5 to be moved based on the information on the upper surface 5a of the package 5 detected by the first detector 30. In this description, the information on the upper surface 5a includes the shape of the upper surface 5a, the area of the upper surface 5a, and the like.

In the present embodiment, the function 1 selects, as the package 5 to be moved, a package 5 closest to the housing main package 21 in the front-rear direction, from the packages 5 whose upper surfaces 5a are imaged by the first detector 30. When there are a plurality of packages 5 closest to the housing main body 21, the package 5, for example, positioned at the center in the width direction is selected as the package 5 to be moved. The condition for determining the package 5 to be moved is not limited to the above, and can be changed as appropriate.

The function 2 is a function of calculating a horizontal position of the center C1 of the upper surface 5a of the selected package 5.

The function 3 is a function of selecting an upper surface sucking portion 62 to be used and a side surface sucking portion 63 to be used based on the information on the upper surface 5a of the selected package 5.

To be specific, based on the width dimension of the package 5 to be moved, the information on the width dimension b of the upper surface sucking portion 62, the information on the intervals E1 and E2, the information on the width dimension c of the side surface sucking portion 63, and the information on the position of the side surface sucking portion 63 in the width direction, stored in the storage 101, the function 3 selects, as the upper surface sucking portion 62 to be used, one or a plurality of upper surface sucking portions 62 arranged in the width direction and having a maximum width dimension not exceeding the width dimension of the upper surface 5a, and as the side surface sucking portion 63 to be used, a side surface sucking portion 63 which allows all the second suction pads 63a to be closed by the side surface 5b when the selected upper surface sucking portion 63 is in contact with the upper surface 5a.

In the present embodiment, as an example, the upper surface sucking portions 62, which are arranged from one end in the width direction toward the other end, are sequentially selected as the upper surface sucking portions 62 to be used. In other words, when the number of the upper surface sucking portions 62 to be used is two, the upper surface sucking portion 62 disposed at one end in the width direction and the upper surface sucking portion 62 adjacent to the upper surface sucking portion 62 are selected as the upper surface sucking portions 62 to be used. When the number of the upper surface sucking portions 62 to be used is three, the upper surface sucking portions 62, including first to third upper surface sucking portions 62 from one end toward the other end in the width direction, are selected as the upper surface sucking portion 62 to be used.

When the first suction pads 62a of the selected upper surface sucking portions 62 come into contact with the upper surface 5a, they are all closed by the upper surface 5a. When the second suction pads 63a of the selected side surface sucking portions 63 come into contact with the side surface 5b, they are all closed by the side surface 5b.

Further, in the present embodiment, the side surface sucking portions 63, disposed from the side surface sucking portion 63 at one end toward the other end in the width direction, are sequentially selected as the upper surface sucking portions 62 to be used. In other words, when the number of the side surface sucking portions 63 to be used is one, which is the minimum number, the side surface sucking portion 63 disposed at one end in the width direction is selected as the side surface sucking portion 63 to be used.

The function 4 is a function of calculating a horizontal position of the center C2 of the selected upper surface sucking portion 62.

The function 5 is a function of controlling the second lifting and lowering device 80, the horizontal moving device 71, the front-rear moving device 64, and the negative pressure generating device 65 based on the position of the center C1 of the upper surface 5a calculated by the function 2, the position of the center C2 calculated by the function 4, and the detection results of the first approach sensors 91, and sucking the upper surface 5a by the plurality of second suction pads 62a of the selected upper surface sucking portion 62 at a position where the center C2 faces the center C1 in the vertical direction or at a position where the center C2 faces a position on the rear side of the center C1 in the front-rear direction.

Whether the center C2 of the selected upper surface sucking portion 62 is made to face the center C1 of the upper surface 5a in the up-down direction or the center C2 is made to face the rear side of the center C1 in the front-rear direction may be determined, for example, before the operation of the cargo-handling apparatus 10 is started.

For example, before the operation of the cargo-handling apparatus 10 is started, the operator selects, as the mode for sucking the upper surface 5a by the selected upper surface sucking portion 62, a mode for sucking the upper surface 5a with the center C2 facing the center C1 in the up-down direction or a mode for sucking the upper surface 5a with the center C2 facing the rear side of the center C1 in the front-rear direction. This selection may be made by operating a button or an input key.

Alternatively, when the horizontal moving device 71 can cause the center C2 of the selected upper surface sucking portion 62 to face a rear side of the center C1 of the upper surface 5a in the front-rear direction, the main control unit 102 may make a determination to cause the center C2 to face a position on the rear side of the center C1 in the front-rear direction. In other words, when the main control unit 102 can cause the center C2 to face the rear side of the center C1 in the front-rear direction based on the movable range of the selected upper surface sucking portion 62 in the front-rear direction by the horizontal moving device 71, the main control unit 102 may cause the center C2 to face the rear side of the center C1.

Alternatively, as described above, the center C2 may be caused to face the center C1 in the up-down direction without the selection by the operator or the selection by the main control unit 102. Alternatively, the center C2 may be caused to face the rear side of the center C1 in the front-rear direction without the selection by the operator or the selection by the main control unit 102.

In this description, the position on the rear side of the center C in the front-rear direction, namely the position on the side opposite to the side surface sucking portion 63 along the direction in which the side surface sucking portion 63 approaches the upper surface sucking portion 62 from the center C1, is a position within a range in which stable suction of the package 5 by the selected upper surface sucking portion 62 can be maintained. This range can be obtained in advance by experiments or the like. The main control unit 102 has information on the position on the rear side in advance. The information on the position on the rear side is, for example, a distance from the center C1. The information on the position on the rear side may be different depending on the size of the upper surface 5a of the package 5.

With this function, the selected upper surface sucking portion 62 can suck the upper surface 5a at a position where the center C2 faces the center C1 of the upper surface 5a of the package 5 that is relatively short in the front-rear direction, or at a position where the center C1 faces the rear side of the center C2 in the front-rear direction. Further, the selected upper surface sucking portion 62 can suck the upper surface 5a at a position where the center C2 faces the center C1 of the upper surface 5a of the package 5 that is relatively long in the front-rear direction, or at a position where the center C1 faces the rear side of the center C2 in the front-rear direction.

The function 6 is a function of controlling the arm 72 to contract, moving the sucking device 60 having sucked the package 5 to the belt 41 of the second belt conveyor 40, and driving the belt 41 at the same speed as the contraction speed of the arm 72.

The function 7 is a function of calculating a height position of the lower surface 5c of the package 5 based on the detection result of the third detector 95.

The function 8 is a function of controlling the second lifting and lowering device 80 based on the height position of the lower surface Sc calculated by the function 7, and adjusting the height position of the upper surface of the belt 41 of the second belt conveyor 40 to the height position of the lower surface 5c.

The function 9 is a function of controlling the second belt conveyor 40 to stop the movement of the belt 41 when the arm 72 is contracted to the minimum length, and controlling the negative pressure generating device 65 to release the suction of the package 5 by the sucking device 60.

The function 10 is a function of controlling the second lifting and lowering device 80 to move the moving device 70 upward when the side surface sucking device 63 is moved in a direction away from the package 5 after the suction of the package 5 by the sucking device 60 is released.

A function 11 is a function of, when the moving device 70 is moved upward, controlling the second belt conveyor 40 to move the package 5 to the first belt conveyor 6 side and controlling the first lifting and lowering device 50 to adjust the height position of the upper surface of the belt 41 of the second belt conveyor 40 to the height position of an upper surface 6a1 of the belt 6a of the first belt conveyor 6.

The sub-control unit 103 specifically includes a function 12 and a function 13.

The function 12 is a function of moving the moving portion 64b to the package 5 side, until it is determined that the side surface sucking portion 63 to be used is closer than a predetermined distance to the side surface 5b based on the detection result of the second approach sensor 92, in other words, until it is determined that the second suction pads 63a of the side surface sucking portion 63 to be used have reached a position where the side surface 5b is sucked.

The function 13 is a function of controlling the front-rear moving device 64 after the suction of the package 5 by the sucking device 60 is released, and moving the side surface sucking portion 63 in a direction away from the package 5.

Next, an example of the operation of the cargo-handling apparatus 10 will be described with reference to FIG. 7 to FIG. 12. First, the main control unit 102 and the sub-control unit 103 set the cargo-handling apparatus 10 to an initial state. In the initial state, at least the moving portion 64b is located at the initial position, the horizontal moving device 71 is located at the uppermost position, and the second belt conveyor 40 is stopped (step S1).

Next, the first detector 30 captures images of the packages 5 placed on the mount portion 7 and transmits the captured images to the main control unit 102 of the controller 100 (step S2).

Next, the main control unit 102 selects a package 5 to be moved to the first belt conveyor 6 from the packages 5 based on the images captured by the first detector 30 (step S3).

In the present embodiment, the main control unit 102 determines, as the package 5 to be moved, the package 5 located at the uppermost stage and located closest to the housing main body 21 side in the front-rear direction. When there are a plurality of packages 5 closest to the housing main body 21 side in the front-rear direction, the package 5 located on the outermost side on one side selected in advance in the width direction is selected as the package 5 to be moved from among those packages 5.

Next, the main control unit 102 calculates the horizontal position of the center C1 of the upper surface 5a of the package 5 to be moved (step S4).

Next, the main control unit 102 selects the upper surface sucking portion 62 to be used and the side surface sucking portion 63 to be used from the information stored in the storage 101 based on the dimension W in the width direction of the package 5 to be moved (step S5).

An example of selection of the upper surface sucking portion 62 to be used and the side surface sucking portion 63 to be used by the main control unit 102 will be described with reference to FIG. 10 to FIG. 12. In this example, the minimum value of the dimensions D in the longitudinal direction of the upper surfaces 5a of the packages 5 placed on the mount portion 7 and the minimum value of the dimension W in the lateral direction of the upper surface 5a of the packages 5 placed on the mount portion 7 is 200 mm, which is the minimum value of the dimension W in the width direction. The height dimension H of the package 5 is 100 mm.

The dimension a in the front-rear direction of the first support portion 62b of the upper surface sucking portion 62 is 160 mm, and the dimension b in the width direction is 80 mm. The dimension in the width direction of the side surface sucking portion 63 is 160 mm and the dimension d in the height direction is 80 mm.

In the example shown in FIG. 10, the dimension in the width direction of the package 5 to be moved is 200 mm. The main control unit 102 first detects the dimension in the width direction of the package 5 based on the image of the upper surface 5a captured by the first detector 30. Next, the main control unit 102 selects the upper surface sucking portion 62 to be used and the side surface sucking portion 63 to be used based on the dimension in the width direction of the upper surface 5a of the package 5, the dimension of the width of the upper surface sucking portion 62, and the dimension of the width of the side surface sucking portion 63 stored in the storage 101.

Since the dimension of the upper surface 5a of the package 5 in the width direction is 200 mm and the dimension b of the first support portion 62b of the upper surface sucking portion 62 in the width direction is 80 mm, the main control unit 102 selects, as the upper surface sucking portions 62 to be used, the upper surface sucking portion 62 positioned at one end in the width direction among the four upper surface sucking portions 62 arranged in the width direction and the upper surface sucking portion 62 adjacent to this upper surface sucking portion 62. The dimension in the width direction of the region in which the lower surface 62c of the first support portion 62 of each of the two upper surface sucking portions 62b is located is (60×2)+the interval E1. The interval E1 is a minute interval and is sufficiently smaller than 40 mm. Therefore, all the first suction pads 62a of the two upper surface sucking portion 62 to be used can suck the inner side of the outer edge of the upper surface 5a of the package 5.

In addition, since the dimension of the package 5 in the width direction is 200 mm, the main control unit 102 selects, as the side surface sucking portion 63 to be used, the side surface sucking portion 63 positioned on the right side which is aligned with the two upper surface sucking portions 62 to be used in the front-rear direction in a plan view. Since the dimension in the width direction of the side surface 5b of the package 5 is 200 mm, the dimension in the height direction of the package 5 is 100 mm, and the dimension c in the width direction of the side surface sucking portion 63 is 160 mm, all the second suction pads 63a of the side surface sucking portion 63 to be used can suck the side surface 5b of the package 5.

In the example shown in FIG. 11, the package 5 to be moved has a dimension of 300 mm in the width direction, a dimension of 200 mm in the front-rear direction, and a dimension of 100 mm in the height direction. When the main control unit 102 detects that the dimension of the detector 30 in the width direction is 300 mm on the basis of the captured image of the first package 5, the main control unit 102 selects, as the upper surface sucking portions 62 to be used, three upper surface sucking portions 62 arranged side by side including the upper surface sucking portion 62 positioned at one end in the width direction from among the four upper surface sucking portions 62 arranged side by side in the width direction.

The dimension from one end to the other end in the width direction of the upper surface sucking portions 62 is (60×3)+E1+E2. The interval E1 and the interval E2 are minute intervals, and the sum thereof does not exceed 120 mm. Therefore, all the first suction pads 62a of the three upper surface sucking portions 62 to be used can suck the upper surface 5a of the package 5.

In addition, since the dimension W of the package 5 in the width direction is 300 mm, the main control unit 102 selects the side surface sucking portion 63 positioned at one end in the width direction as the side surface sucking portion 63 to be used. Since the dimension in the width direction of the package 5 is 300 mm and the dimension in the height direction is 100 mm, all the second suction pads 63a of the side surface sucking portion 63 to be used can suck the side surface 5b of the package 5.

In the example shown in FIG. 12, the dimension in the width direction of the package 5 to be moved is 400 mm, the dimension in along the front-rear direction is 200 mm, and the dimension in the height direction is 100 mm. When the main control unit 102 detects that the dimension of the package 5 in the width direction is 400 mm based on the image captured by the first detector 30, the main control unit 102 selects all the upper surface sucking portions 62 as the upper surface sucking portions 62 to be used. The dimension from one end to the other end in the width direction of the four upper surface sucking portions 62 is (60×4)+(E1×2)+E2. The interval E1 and the interval E2 are minute intervals, and the sum thereof does not exceed 160 mm. Therefore, all the suction pads 62a of the four upper surface sucking portions 62 to be used can suck the upper surface 5a of the package 5.

In addition, since the dimension in the width direction of the package 5 is 400 mm and the dimension in the height direction is 100 mm, the main control unit 102 selects all the side surface sucking portions 63 as the side surface sucking portions 63 to be used. The dimension from one end to the other end in the width direction of the two side surface sucking portions 63 is (160×2)+E3. The interval E3 is a minute interval and does not exceed 80 mm. Therefore, all the second suction pads 63a of the two side surface sucking portions 63 to be used can suck the side surface 5b of the package 5.

After selecting the upper surface sucking portions 62 to be used and the side surface sucking portions 63 to be used in step S5, the main control unit 102 controls the negative pressure generating device 65 to suck the first suction pads 62a of the selected upper surface sucking portions 62 and the second suction pads 63a of the selected side surface sucking portions 63 (step S6). Here, the non-selected upper surface sucking portions 62 and the non-selected side surface sucking portions 63 are not sucked.

Next, the sub-control unit 103 controls the moving device 70 to move the sucking device 60 to a position where the center C2 of the selected upper surface sucking portions 62 faces the center C1 of the upper surface 5a of the package 5 in the vertical direction (step S7).

Next, the main control unit 102 controls the second drive unit 81 to lower the sucking device 60 until the first approach sensor 91 detects that the second suction pads 62a of the selected upper surface sucking portions 62 have reached the position at which the upper surface 5a is sucked (step S8 and No in step S9).

When, based on the detection result of the first approach sensor 91, the main control unit 102 has detected that the suction pads 62a of the selected upper surface sucking portions 62 have reached a position at which the upper surface 5a can be sucked (Yes in step S9), the main control unit 102 controls the second lifting and lowering device 80 to stop the lowering of the upper surface sucking portions 62 (step S10).

At the position where the lowering of the upper surface sucking portion 62 is stopped, the opening 62a1 of each of the first suction pads 62a is closed by the upper surface 5a, and thus the inside of each of the first suction pads 62a is evacuated to generate a negative pressure. Each of the first suction pads 62a sucks the upper surface 5a by the negative pressure. At this time, the first suction pads 62a of the selected upper surface sucking portions 62 do not come into contact with the upper surface 5a of any other package 5. When the first suction pads 62a of the selected upper surface sucking portions 62 have sucked the upper surface 5a, the main control unit 102 sends an instruction to the sub-control unit 103 to move the side surface sucking portions 63.

Next, when the sub-control unit 103 has received the instruction from the main control unit 102, based on the detection result of the second approach sensor 92, the sub-control unit 103 controls the driving portion 64c of the front-rear moving device 64 to move the side surface sucking portions 63 to the package 5 side until it is detected that the second suction pads 63a of the selected side surface sucking portions 63 have reached the position where the side surface 5b is sucked (step S11, and No in step S12).

When the sub-control unit 103 has determined that each of the second suction pads 63a of the selected side surface sucking portion 63 has reached the position at which the side surface 5b is sucked based on the detection result of the second approach sensor 92 (Yes in step S12), the sub-control 13 controls the driving portion 64c to stop the movement of the side surface sucking portions 63 (step S13).

At the position where the movement of the side surface sucking portions 63 is stopped, the opening 63a1 of each of the second suction pads 63a of the selected side surface sucking portions 63 is closed by the side surface 5b to be evacuated, and a negative pressure is generated inside each of the second suction pads 63a. Each of the second suction pads 63a sucks the side surface 5b by the negative pressure.

When the second suction pads 63a of the selected side surface sucking portions 63 have sucked the side surface and the first suction pads 62a of the selected upper surface sucking portions 62 have sucked the upper surface 5a, the main control unit 102 controls the second lifting and lowering device 80 to move the sucking device 60 upward by a predetermined amount (step S14). The predetermined amount is a movement amount by which a state in which the lower end of the package 5 inclined by its own weight as shown in FIG. 4 is in contact with the upper surface 5a of another package 5 positioned below the package 5 is maintained. When the sucking device 60 is moved upward by the predetermined amount, the main control unit 102 stops the second lifting and lowering device 80.

Next, the main control unit 102 controls the arm 72 to horizontally move the package 5 sucked by the sucking device 60 and draw it into the housing main body 21 (step S15).

Next, the main control unit 102 calculates the position of the lower surface 5c of the package 5 to be moved based on the detection result of the third detector (step S16).

Next, the main control unit 102 controls the first lifting and lowering device 50 to move the second belt conveyor 40 in the up-down direction and to adjust the height position of the upper surface 41a of the belt 41 of the second belt conveyor 40 to the lower surface 5c (step S17).

Next, the main control unit 102 controls the motor 42 to move the upper surface 41a at the same speed as the contraction speed of the arm 72 until it is determined that the arm 72 has contracted to the minimum dimension (step S18 and No in step S19). After the lower surface 5c of the package 5 is placed on the upper surface 41a, the package 5 is moved while a part of the lower surface 5c is supported by the upper surface 41a.

For example, the arm 72 may be provided with a sensor for detecting the dimension of the arm 72, and the main control unit 102 may determine that the dimension of the arm 72 is the minimum dimension based on the detection result of this sensor.

Next, when the main control unit 102 has determined that the arm 72 has contracted to the minimum dimension (Yes in Step S19), the main control unit 102 stops the driving of the arm 72 and controls the motor 42 to stop the movement of the belt 41 (step S20). In a state in which the arm 72 has the minimum length, the center C2 of the upper surface sucking portions 62 to be used is positioned above the upper surface 41a of the belt 41. Since the center C2 is located above the upper surface 41a, a half or more of the area of the lower surface Sc of the package 5 is placed on the upper surface 41a.

Next, the main control unit 102 controls the negative pressure generating device 65 to release the suction of the package 5 by the first suction pads 62a and the second suction pads 63a (step S21).

Next, the sub-control unit 103 controls the driving portion 64c of the front-rear moving device 64 to move the side surface sucking portions 63 in a direction of retracting from the package 5 (step S22).

Next, the main control unit 102 controls the second lifting and lowering device 80 to move the sucking device 60 upward (step S23).

Next, the main control unit 102 controls the first lifting and lowering device 50 to adjust the height position of the upper surface 41a of the belt 41 of the second belt conveyor 40 to the height position of the upper surface of the belt 6a of the first belt conveyor 6 (step S24).

Next, the main control unit 102 controls the second belt conveyor 40 to move the belt 41 and move the package 5 to the first belt conveyor 6 (step S25).

In the cargo-handling apparatus 10 having the configuration described above, each of the upper surface sucking portions 62 is configured to suck the upper surface of the package 5, and the upper surface sucking portion 62 to be used is selected in accordance with the upper surface 5a of the package 5. Therefore, packages 5 can be sucked one by one.

Further, the selected upper surface sucking portions 62 suck the upper surface Sa at a position where the center C2 of the selected upper surface sucking portion 62 is located at the center C1 of the upper surface 5a of the package 5 or at the rear side of the center C1 in the front-rear direction.

Therefore, the selected upper surface sucking portions 62 can keep the orientation of stably sucking the package 5.

Further, the sucking device 60 includes the surface sucking portions 63, and the side surface sucking portion to be used is selected in accordance with the upper surface 5a of the package 5. For this reason, the side surface 5b of the package 5 is sucked by the side surface sucking portions 63, and thus the package 5 can be sucked on two surfaces. Therefore, the sucking device 60 can more firmly suck the package 5.

Further, by adjusting the positions of the side surface sucking portions 63 with respect to the upper surface sucking portions 62 by the front-rear moving device 64, a wide region of the lower surface 5c of each of the packages 5 having different front-rear lengths can be placed on the belt 41 without increasing the maximum pull-in amount of the moving device 70. Therefore, the length of the arm 72 in the front-rear direction can be compact.

In other words, if the positions of the side surface sucking portions 62 with respect to the upper surface sucking portions 63 cannot be adjusted, for example, in a case of a package 5 having a long front-rear length, in order to place a wide region of the lower surface 5c on the belt 41, it is necessary to increase the movement amount of the sucking device 60 toward the first belt conveyor 6 side. Therefore, it is necessary to increase the front-rear length of the housing main body 21, resulting in an increase in the size of the cargo-handling apparatus 10.

However, in the present embodiment, since the length of the arm 72 in the front-rear direction can be compact, it is not necessary to increase the front-rear length of the housing main body 21, so that an increase in the size of the cargo-handling apparatus 10 can be prevented.

Further, it is possible to bring the first suction pads 62a of the selected upper surface sucking portions 62 into contact with the upper surface 5a of the package 5 and then bring the second suction pads 63a of the selected side surface sucking portions 63 into contact with the side surface 5b of the package 5 in a state in which the side surface sucking portions 63 are retracted to a position that does not interfere with the package 5.

Therefore, since the second suction pads 63a of the selected side surface sucking portions 63 can be pressed against the side surface 5b in a direction orthogonal to the side surface, the openings 63a1 of the second suction pads 63a can be reliably closed by the side surface 5b. As a result, loss of suction force due to a negative pressure generated in the second suction pads 63a and the tube 66 can be prevented, so that the package 5 can be stably sucked.

Further, since the cargo-handling apparatus 10 has the second belt conveyor 40, the movement of the package 5 from the mount portion 7 to the first belt conveyor 6 is not performed only by the moving device 70. If the package 5 is moved to the first belt conveyor 6 only by the moving device 70, it is necessary to dispose a part of the arm 72 above the first belt conveyor 6. In this case, the housing main body 21 covers a part of the first belt conveyor 6, resulting in an increase in size.

However, in the present embodiment, since the package 5 is moved to the first belt conveyor 6 by the second belt conveyor 40, it is not necessary to dispose a part of the arm 72 above the first belt conveyor 6, so that the housing main body 21 can be compact.

Further, when the center C2 of the upper surface sucking portions 62 to be used (selected) has been moved above the upper surface 41a of the second belt conveyor 40 at the time of drawing the package 5 from the mount portion 7 into the housing main body 21, the suction of the package 5 by the upper surface sucking portions 62 to be used and the side surface sucking portions 63 to be used is released, so that the package 5 can be stably placed on the upper surface 41a.

Further, after the suction of the upper surface sucking portions 62 to be used and the side surface sucking portions 63 to be used is released, the front-rear moving device 64 is controlled to retract the side surface sucking portions 63 with respect to the package 5, and the upper surface sucking portions 62 and the side surface sucking portions 63 are retracted upward by the moving device 70, thereby preventing interference between the package 5 placed on the upper surface 41a of the second belt conveyor 40 and the upper surface sucking portions 62 and the side surface sucking portions 63.

Further, when the package 5 is drawn from the mount portion 7 into the housing main body 21, the belt 41 of the second belt conveyor 40 is moved at the same speed as the contraction speed of the arm 72, and the lower end and the upper end of the package 5 move at the same speed when the package 5 is placed on the belt 41, so that the orientation of the package 5 does not become unstable. In other words, the package 5 can be stably placed on the belt 41.

Further, the upper surface sucking portion 62 has the first suction pads 62a, and the first suction pads 62a are fluidically connected to the negative pressure generating device 65 via one tube 66. In other words, since one tube 66 is not provided for each of the first suction pads 62a, it is possible to prevent an increase in the number of tubes 66 connected to the sucking device 60. Similarly, the side surface sucking portions 63 have the second suction pads 63a, and the second suction pads 63a are fluidically connected to the negative pressure generating device 65 via one tube 66. Therefore, it is possible to prevent an increase in the number of tubes 66 connected to the sucking device 60.

As described above, according to the cargo-handling apparatus 10 of the present embodiment, packages 5 can be sucked one by one.

The present invention is not limited to the above-described embodiment and can be embodied in practice by modifying the structural elements without departing from the gist of the invention.

In the present embodiment, the two side surface sucking portions 63 are configured to be integrally movable in the front-rear direction with respect to the upper surface sucking portions 62 by the front-rear moving device 64, but the present invention is not limited to this example. In another example, the side surface sucking portions 63 may be configured to be movable independently one by one in the front-rear direction.

As an example of a configuration in which the side surface sucking portions 63 are independently moved one by one, each of the side surface sucking portions 63 may be provided with the front-rear moving device 64. In this way, if the side surface sucking portions 63 are independently moved one by one, when sucking the package 5 to be moved, only the side surface sucking portion 63 to be used may be moved to bring the second suction pads 63a into contact with the side surface 5b, and the side surface sucking portions 63 not to be used may not be moved. Therefore, since the second suction pad 63a of the side surface sucking portion 63 not to be used does not come into contact with the side surface 5b of the package 5 that is not the movement target, the package 5 other than the movement target is not moved due to the contact.

Figure 13:
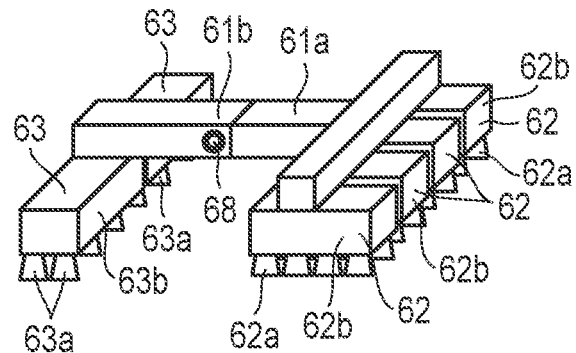
FIG. 13 is a perspective view showing a configuration of a modification of the sucking device.
Figure 14:
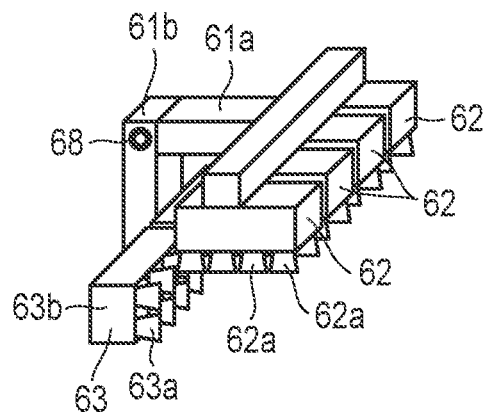
FIG. 14 is a perspective view showing a configuration of the modification.

Alternatively, the side surface sucking portion 63 is not limited to the configuration movable in the front-rear direction. In another example, as shown in FIG. 13 and FIG. 14, the two side surface sucking portions 63 may be configured to be movable between a position where the second suction pads 63a are in contact with the side surface 5b of the package 5 and a position where the second suction pads 63a are separated from the side surface 5b by integrally rotating the two side surface sucking portions 63 with respect to the upper surface sucking portions 62 about a predetermined position as a rotation center.

As an example of this configuration, the end portion of the extension portion 61b may be configured to be rotatable with respect to the base portion main body 61a about a rotation shaft 68 parallel to the width direction. FIG. 13 shows a state in which the extension portion 61b is at a position to be parallel to the base portion main body 61a. FIG. 14 shows a state in which the extension portion 61b rotates about the rotation shaft 68 and the second suction pads 63a are at a position of sucking the side surface 5b.

Furthermore, in this configuration, by rotating the extension portion 61b with respect to the base portion main body 61a to set the orientation of the side surface sucking portions 63 to an orientation in which the sucking direction is parallel to the sucking direction of the upper surface sucking portions 62, it is also possible to suck the upper surface Sa of the package 5 by the side surface sucking portions 63.

As a modification of the configuration in which the two side surface sucking portions 63 are rotatable with respect to the upper surface sucking portions 62, the side surface sucking portions 63 may be configured to be independently rotatable with respect to the upper surface sucking portions 62.

Figure 15:
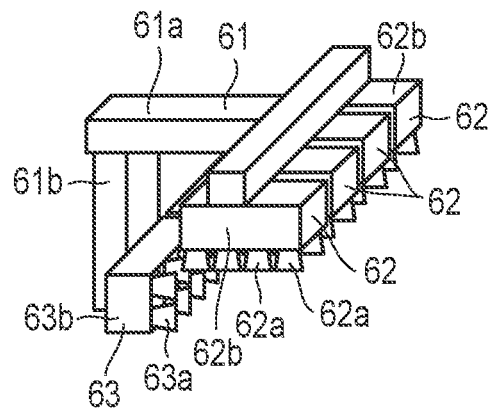
FIG. 15 is a perspective view showing a configuration of another modification of the sucking device.

Alternatively, in another example, the side surface sucking portions 63 are not limited to the configuration movable with respect to the upper surface sucking portions 62. For example, as shown in FIG. 15, the side surface sucking portions 63 may be fixed so as to be immovable with respect to the upper surface sucking portions 62.

Further, in the present embodiment, the sucking device 60 includes the four upper surface sucking portions 62 and two side surface sucking portions 63, but the number of upper surface sucking portions 62 and the number of side surface sucking portions 63 are not limited. For example, the sucking device 60 may use three, five, or another plural number of sucking portions.

The side surface sucking portions 63 are arranged in the vertical direction in one row in the present embodiment, but the embodiment is not limited thereto. In another example, the side surface sucking portions 63 may be arranged in a plurality of rows in the vertical direction. In this case, for example, the height of the package 5 may be detected by a detector that detects the height of the package 5, and the side surface sucking portion 63 to be used may be selected according to the height.

The sucking device 60 includes the side surface sucking portions 63, but the embodiment is not limited thereto. In another example, the sucking device 60 may not include a side surface sucking portion 63.

Alternatively, by setting the distance from the lower end of the first suction pads 62a of the upper surface sucking portions 62 to the lower end of the side surface sucking portions 63 smaller than the minimum value of the height dimensions of the packages 5, the side surface sucking portions 63 do not interfere with the package positioned below the package 5 which the upper surface sucking portion 62 is sucking. For this reason, the sucking device 60 can suck not only the package 5 disposed at the position closest to the housing main body 21 from among the packages 5 whose upper surfaces 5a are exposed, but also a package 5 on the rear side. In this case, it is necessary that nothing interfere with the package 5 below the lower end of the side surface sucking portions 63. In the configuration of the present embodiment, the lower end of the extension portion 61b needs to be located at the same position as the lower end of the side surface sucking portions 63 in the vertical direction or at a position higher than the lower end of the side surface sucking portions 63.

In addition, in the present embodiment, the second detector 90 has the first approach sensor 91 as a configuration for detecting that the selected upper surface sucking portion 62 has approached the upper surface 5a of the package 5 by a predetermined fixed distance or more, and the second approach sensor 92 as a configuration for detecting that the side surface sucking portion 63 has approached the side surface 5b of the package 5 by a predetermined fixed distance or more, but the embodiment is not limited thereto. The second detector 90 may be, for example, a camera capable of capturing an image of the upper surface 5a and the side surface 5b of the package. In this case, a plurality of cameras may be used. Alternatively, the camera used as the first detector 30 may also be used as the second detector 90. Alternatively, a switch may be used. As an example of a case where the switch is used, a switch that is turned on or off when the first suction pad 62a of the upper surface sucking portion 62 reaches a position where the upper surface 5a is sucked may be used, and a switch that is turned on or off when the second suction pad 63a of the side surface sucking portion 63 reaches a position where the side surface 5b is sucked may be used.

The cargo-handling apparatus 10 includes the negative pressure generating device 65, but the embodiment is not limited thereto. For example, if it is possible to use a pump originally installed at the site 1 where the cargo-handling apparatus 10 is installed, the cargo-handling apparatus 10 may utilize such a pump.

Further, in the present embodiment, the negative pressure generating device 65 is commonly used for the upper surface sucking portions 62 and the side surface sucking portions 63, and the suction by the upper surface sucking portions 62 and the suction by the side surface sucking portions 63 are simultaneously released. However, the embodiment is not limited thereto. The release of the suction by the upper surface sucking portions 62 and the release of the suction by the side surface sucking portions 63 may be independently performed.

In the case of this configuration, if the upper surface sucking portions 62 to be used (selected) suck the upper surface 5a at a position where the center C2 faces the front side of the center C1 of the upper surface 5a, in other words, the housing main body 21 side, only a region less than half of the lower surface 5c of package 5 may be placed on the belt 41 even when the arm 72 is at the minimum length. In such a case, only the suction by the upper surface sucking portions 62 can be released to drive the belt 41 and also to drive the front-rear moving device 64 to pull in the package 5 sucked by the side surface sucking portions 63, whereby the package 5 can be stably placed on the belt 41.

Further, in the present embodiment, in a state in which air is sucked by the upper surface sucking portions 62 to be used (selected) and the side surface sucking portions 63 to be used (selected) by controlling the negative pressure generating device 65, the horizontal moving device 71 and the front-rear moving device 64 are driven. With this driving, when the used upper surface sucking portions 62 come into contact with the upper surface 5a, the upper surface 5a is sucked by the used upper surface sucking portions 62, and when the used side surface sucking portions 63 come into contact with the side surface 5b, the side surface is sucked by the second suction pads 63a.

However, the horizontal moving device 71 and the front-rear moving device 64 are not limited to being driven in a state in which air is sucked by the upper surface sucking portions 62 to be used (selected) and the side surface sucking portions 63 to be used. In another example, after the upper surface sucking portions 62 to be used come into contact with the upper surface 5a and the side surface sucking portions 63 to be used come into contact with the side surface 5b, the negative pressure generating device 65 may be controlled to suck the air in the upper surface sucking portions 62 to be used and the side surface sucking portions 63 to be used.

Alternatively, if the negative pressure generating device 65 is configured to independently suck the air in the upper surface sucking portions 62 to be used and the air in the side surface sucking portion 63 to be used, the negative pressure generating device 65 may be controlled to suck the air in the upper surface sucking portions 62 to be used after the upper surface sucking portions 62 to be used come into contact with the upper surface 5a, and then the negative pressure generating device 65 may be controlled to suck the air in the side surface sucking portions 63 to be used after the side surface sucking portions 63 to be used come into contact with the side surface 5b.

Furthermore, in the present embodiment, when the package 5 is drawn from the mount portion 7 into the housing main body 21, the belt 41 of the second belt conveyor 40 is moved at the same speed as the contraction speed of the arm 72. In other words, the moving speed of the package 5 along the front-rear direction when the package 5 is drawn into the housing main body 21 is the same as the moving speed of the upper surface 41a of the belt 41. However, these are not limited to the same speed. In another example, the moving speed of the package 5 along the front-rear direction when the package 5 is drawn into the housing main body 21 may be slower or faster than the moving speed of the upper surface 41a of the belt 41.

In addition, in the present embodiment, the selected upper surface sucking portions 62 suck the center C1 of the upper surface 5a of the package 5 or a position on a side opposite to the side surface sucking portions 63 across the side surface 5b from the center C1. The selected upper surface sucking portions 62 sucking the center C1 means that the upper surface 5a is sucked at a position where the center C2 of the selected upper surface sucking portions 62 faces the center C1 in the up-down direction.

However, the suction by the selected upper surface sucking portions 62 is not limited to sucking the center C1 of the upper surface 5a or the side opposite to the side surface sucking portions 63 across the side surface 5b from the center C1. In another example, the selected upper surface sucking portions 62 may suck the approximate center of the upper surface 5a or a side opposite to the side surface sucking portions 63 across the side surface 5b from the approximate center.

The approximate center of the upper surface 5a is a position including the center C1 and the vicinity of the center C1. Sucking the approximate center of the upper surface 5a is not strictly limited to sucking the upper surface Sa at a position where the center C2 faces the center C1 in the up-down direction. For example, depending on the accuracy of the movement of the moving device 70 and the accuracy of the movement of the front-rear moving device 64, even when the selected upper surface sucking portions 62 are moved so that the center C2 face the center C1 in the up-down direction, the center C2 may be horizontally deviated from the center C1 of the upper surface 5a, and the center C2 of the selected upper surface sucking portions 62 may not face the center C1 in the up-down direction. In this case, the center C1 faces the approximate center of the upper surface 5a. As described above, the approximate center of the upper surface 5a absorbs a positional deviation caused by a movement error of the apparatus or the like.

In the present embodiment, after the selected upper surface sucking portions 62 and the selected side surface sucking portions 63 suck the package 5, the moving device 70 is controlled to move the package 5 to the second belt conveyor 40. At this time, the moving speed of the belt 41 of the second belt conveyor 40 was, for example, the same as the moving speed of the package 5. In other words, the belt 41 of the second belt conveyor 40 is moved at the same speed as the contraction speed of the arm 72 when the package 5 is drawn from the mount portion 7 into the housing main body 21.

After the package 5 has been moved to the first belt conveyor 6, the suction of the package 5 by the selected (used) upper surface sucking portions 62 and the selected (used) side surface sucking portions 63 is released. When the suction of the package 5 is released, the front-rear moving device 64 is moved in a direction away from the package 5, and the moving device 70 is controlled to move the upper surface sucking portions 62 and the side surface sucking portions 63 upward.

However, when the package 5 is drawn from the mount portion 7 into the housing main body 21, the speed of contraction of the arm 72 and the speed of movement of the belt 41 of the second belt conveyor 40 are not limited to the same speed. Even if the moving speed of the package 5 and the moving speed of the belt 41 are not the same, the package 5 can be placed on the belt 41.

That is, the controller (control unit) 100 may control the moving device (first moving device) 70 to move the package 5 to the second belt conveyor 40 after the selected upper surface sucking portions 62 and the selected side surface sucking portions 63 suck the package 5, release the suction by the selected upper surface sucking portions 62 and the selected side surface sucking portions 63, control the front-rear moving device (second moving device) 64 to move the selected side surface sucking portions 63 in a direction away from the upper surface sucking portions 62, and control the moving device 70 to move the upper surface sucking portions 62 and the side surface sucking portions 63 upward.

Each of the upper sucking portions 62 includes the first suction pads 62a, and the tube 66 that fluidically connects the first suction pads 62a to the negative pressure generating device 65. Further, each of the side sucking portions 63 includes the second suction pads 63a, and the tube 66 that fluidically connects the second suction pads 63a to the negative pressure generating device 65.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cargo-handling apparatus comprising:
a detector configured to detect information on upper surfaces of a plurality of packages;
a plurality of upper surface sucking portions configured to suck an upper surface of a package, each of the upper surface sucking portions including a plurality of first suction pads and configured to be individually evacuated;
a plurality of side surface sucking portions configured to suck a side surface of the package, each of the side surface sucking portions including a plurality of second suction pads and configured to be individually evacuated;
a first moving device configured to move the upper surface sucking portions and the side surface sucking portions;
a storage that stores dimensional information on the upper surface sucking portions and dimensional information on the side surface sucking portions;
a control unit configured to:
select a package from the packages based on information on the upper surfaces of the packages detected by the detector;
select a maximum number of upper surface sucking portions that come into contact with the upper surface of the selected package from the upper surface sucking portions, based on the dimensional information on the upper surface sucking portions stored in the storage and the information on the upper surface of the selected package;
select a side surface sucking portion in which the second suction pads are closed by the side surface of the selected package, based on the dimensional information on the side surface sucking portions stored in the storage; and
control the first moving device, the upper surface sucking portions, and the side surface sucking portion to suck the upper surface of the selected package by the first suction pads of the selected upper surface sucking portions and suck the side surface of the selected package by the second suction pads of the selected side surface sucking portion; and
a conveyor on which the package sucked by the selected upper surface sucking portion and the side surface sucking portion and moved by the first moving device is placed, and which moves the selected package.

2. The cargo-handling apparatus according to claim 1, wherein each of the upper surface sucking portions is configured to be individually evacuated.

3. The cargo-handling apparatus according to claim 1, wherein the first moving device moves the selected upper surface sucking portion to a position at which the selected upper surface sucking portions suck an approximate center of the upper surface, or to a position at which the selected upper surface sucking portions suck a side opposite to the side surface sucking portion from the approximate center.

4. The cargo-handling apparatus according to claim 1, wherein each of the side surface sucking portions is configured to be individually evacuated.

5. The cargo-handling apparatus according to claim 1, comprising a second moving device configured to move the selected side surface sucking portion in a direction approaching the side surface and in a direction away from the side surface.

6. The cargo-handling apparatus according to claim 5, wherein the control unit is configured to control the first moving device to lower the selected upper surface sucking portions toward the package to move the selected upper surface sucking portions to a position where the selected upper surface sucking portions suck the upper surface, and thereafter control the second moving device to move the selected side surface sucking portion to a position where the selected side surface sucking portion sucks the side surface.

7. The cargo-handling apparatus according to claim 1, wherein:
each of the upper surface sucking portions has a plurality of suction pads; and
each of the side surface sucking portions has a plurality of suction pads.

8. The cargo-handling apparatus according to claim 1, wherein:
the control unit is configured to select the side surface sucking portion to be used from the side surface sucking portions based on the dimensional information on the side surface sucking portion stored in the storage and the upper surface information on the package.

9. A program for a computer of a cargo-handling apparatus including a detector configured to detect information on an upper surfaces of a plurality of packages, a plurality of upper surface sucking portions configured to suck the upper surface, each of the upper surface sucking portions including a plurality of first suction pads and configured to be individually evacuated, a plurality of side surface sucking portions configured to suck a side surface of the package, each of the side surface sucking portions including a plurality of second suction pads and configured to be individually evacuated, and a storage that stores dimensional information on the upper surface sucking portions and dimensional information on the side surface sucking portions, the program causing the computer to realize:
a function of selecting a package from the packages based on information on the upper surfaces of the package the packages detected by the detector;
a function of selecting a maximum number of upper surface sucking portions that come into contact with the upper surface of the selected package from the upper surface sucking portions, based on the dimensional information on the upper surface sucking portions stored in the storage and information on the upper surface of the selected package;
a function of selecting a side surface sucking portion in which the second suction pads are closed by the side surface of the selected package, based on the dimensional information on the side surface sucking portions stored in the storage;
a function of sucking the upper surface of the selected package by the first suction pads of the selected upper surface sucking portions; and
a function of sucking the side surface of the selected package by the second suction pads of the selected side surface sucking portion.

* * * * *